(12) United States Patent
Ishihara et al.

(10) Patent No.: US 7,057,684 B2
(45) Date of Patent: Jun. 6, 2006

(54) LIQUID CRYSTAL DISPLAY WITH VARYING THICKNESS

(75) Inventors: Shoichi Ishihara, Osaka (JP); Daiichi Suzuki, Ishikawa (JP); Mitsutaka Okita, Ishikawa (JP); Kenji Nakao, Osaka (JP); Yoshinori Tanaka, Osaka (JP); Tsuyoshi Uemura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 152 days.

(21) Appl. No.: 10/220,064

(22) PCT Filed: Oct. 17, 2003

(86) PCT No.: PCT/JP01/09093

§ 371 (c)(1),
(2), (4) Date: Aug. 28, 2002

(87) PCT Pub. No.: WO02/33483

PCT Pub. Date: Apr. 28, 2002

(65) Prior Publication Data

US 2003/0011732 A1 Jan. 16, 2003

(30) Foreign Application Priority Data

Oct. 17, 2000 (JP) ............................. 2000-316160

(51) Int. Cl.
*G02F 1/1335* (2006.01)
*G09G 3/36* (2006.01)

(52) U.S. Cl. ........................ 349/107; 349/117; 345/88

(58) Field of Classification Search ................ 349/107, 349/117; 345/88
See application file for complete search history.

(56) References Cited

U.S. PATENT DOCUMENTS 5,013,138 A * 5/1991 Roosen et al. ............... 349/107

(Continued)

FOREIGN PATENT DOCUMENTS

JP    60-202423    10/1985

(Continued)

OTHER PUBLICATIONS

Seiichi Nagata et al., Twisted-Nematic Liquid-Crystal Full-Color Display Panel with Reduced Rotatory Dispersion. pp. 84-85.

*Primary Examiner*—Andrew Schechter
*Assistant Examiner*—Hoan C. Nguyen
(74) *Attorney, Agent, or Firm*—McDermott Will & Emery LLP

(57) ABSTRACT

A liquid crystal display according to the invention includes a liquid crystal display element (100) having a liquid crystal layer (4) containing liquid crystal molecules oriented so as to assume a bend alignment when an image display is being made, and at least one retardation plate for compensating for a retardation of the liquid crystal layer, wherein the display is made by varying the retardation of the liquid crystal layer in accordance with video signals inputted from outside to vary the transmittance of the liquid crystal display element to light for display, characterized in that: the liquid crystal display element (100) includes a plurality of red pixels for displaying a red color, a plurality of green pixels for displaying a green color, and a plurality of blue pixels for displaying a blue color; and a thickness (53B) of the liquid crystal layer (4) associated with the blue pixels is larger than a thickness (53R, 53G) of the liquid crystal layer associated with the red pixels and/or the green pixels.

4 Claims, 25 Drawing Sheets

U.S. PATENT DOCUMENTS

| | | | | |
|---|---|---|---|---|
| 5,237,437 A | * | 8/1993 | Rupp | 349/107 |
| 6,016,178 A | * | 1/2000 | Kataoka et al. | 349/117 |
| 6,037,084 A | * | 3/2000 | Ting et al. | 430/7 |
| 6,437,844 B1 | * | 8/2002 | Hattori et al. | 349/129 |
| 6,456,266 B1 | * | 9/2002 | Iba et al. | 345/87 |

FOREIGN PATENT DOCUMENTS

| | | | |
|---|---|---|---|
| JP | 64-082015 | | 3/1989 |
| JP | 2-287428 | | 11/1990 |
| JP | 3-296720 | | 12/1991 |
| JP | 4-003018 | | 1/1992 |
| JP | 405203970 | * | 8/1993 |
| JP | 7-084254 | | 3/1995 |
| JP | 7-114020 | | 5/1995 |
| JP | 8-172732 | | 7/1996 |
| JP | 8-211361 | | 8/1996 |
| JP | 9-197397 | | 7/1997 |
| JP | 9-230332 | | 9/1997 |
| JP | 9-258226 | | 10/1997 |
| JP | 9-285226 | | 10/1997 |
| JP | 10-073799 | | 3/1998 |
| JP | 10-104612 | | 4/1998 |
| JP | 10-177174 | | 6/1998 |
| JP | SHO 59-208577 | | 11/1998 |
| JP | 11-014761 | | 1/1999 |
| JP | 11-014988 | | 1/1999 |
| JP | 11-024073 | | 1/1999 |
| JP | 411052327 | * | 2/1999 |
| JP | 11-271759 | | 10/1999 |
| JP | 11-352487 | | 12/1999 |
| JP | 2000-098919 | | 4/2000 |
| JP | 2000-190385 A | | 7/2000 |
| WO | WO 96/37804 | | 11/1996 |

* cited by examiner

| REFRACTIVE INDEX ANISOTROPY OF LIQUID CRYSTAL MATERIAL Δn | RETARDATION Δnd/μm | | | | | | |
|---|---|---|---|---|---|---|---|
| | 0.61 | 0.72 | 0.80 | 0.91 | 0.98 | 1.07 | |
| 0.1223 | × | × | × | × | × | × | |
| 0.1305 | × | × | × | × | × | × | |
| 0.1382 | △ | △ | △ | × | × | × | |
| 0.1431 | △ | △ | △ | △ | × | × | |
| 0.1502 | ○ | ○ | ○ | △ | × | × | |
| 0.1590 | ○ | ○ | ○ | △ | △ | × | |
| 0.1688 | ○ | ○ | ○ | △ | △ | × | |
| 0.1813 | ○ | ○ | ○ | △ | × | × | |
| 0.1955 | ○ | ○ | ○ | △ | × | × | |

○ : WITH LITTLE BLUISHNESS
△ : WITH BLUISHNESS TO SOME EXTENT
× : WITH BLUISHNESS

FIG.16

LIQUID CRYSTAL DISPLAY WITH VARYING THICKNESS

TECHNICAL FIELD

The present invention relates to liquid crystal displays having such display capabilities as high-speed response and wide viewing angle and, more particularly, to an optically self-compensated birefringence embodiment (OCB embodiment) liquid crystal display and a method of manufacturing the same.

BACKGROUND ART

In recent years, a great amount of image information is being circulated with the progress of multimedia technology. Liquid crystal displays have sprung into wide use as means for displaying such image information. This is because high contrast and wide viewing angle liquid crystal displays have been developed and put to practical use by virtue of the progress of liquid crystal technology. At present, the display capability of liquid crystal displays has reached a level comparable to that of CRT displays.

Liquid crystal displays, however, involve a problem that they are not suited to motion picture display because the responsiveness thereof is insufficient for motion picture display. Specifically, though the NTSC (National Television System Committee) system now in force requires that liquid crystal make a response within one frame period (16.7 msec), existing liquid crystal displays take 100 msec or longer to make a response at a portion between adjacent levels of gray in a multi-level gray scale display. For this reason, there occurs a phenomenon that an image blurs in a motion picture display. Particularly at a portion between adjacent levels of gray in a region at which the driving voltage is low, a response is considerably delayed and, hence, a favorable motion picture display cannot be realized.

In this respect, many attempts have been made to make higher the responsiveness of liquid crystal displays. Though various liquid crystal display systems for high-speed response have been summarized by Wu et al. (C. S. Wu and S. T. Wu, SPIE, 1665, 250 (1992)), the number of such systems expected to have response characteristics required for motion picture display is limited at present.

Presently, liquid crystal displays comprising an OCB embodiment liquid crystal display element, a ferroelectric liquid crystal display element or an antiferroelectric liquid crystal display element are considered to be promising as liquid crystal displays having such high-speed response as to be suited for motion picture display.

Among such liquid crystal display elements, ferroelectric liquid crystal display elements and antiferroelectric liquid crystal display elements, which are of a layered structure, involve many problems in terms of practical use such as low impact resistance, narrow service temperature range, and high temperature dependence of characteristics. For this reason, attention is actually focused on OCB embodiment liquid crystal display elements using nematic liquid crystal.

In 1983, J. P. Bos demonstrated the high-speed response of such an OCB embodiment liquid crystal display element. Thereafter, OCB embodiment liquid crystal display elements were proved to exhibit both wide viewing angle and high-speed response compatibly with each other if it is provided with a retardation plate. Since then, research and development of such OCB embodiment liquid crystal display elements has become active.

FIG. 24 is a sectional view schematically showing the construction of a conventional OCB embodiment liquid crystal display element. As shown in FIG. 24, the OCB embodiment liquid crystal display element includes a glass substrate 1 formed with a transparent electrode 2 on the underside thereof, a glass substrate 8 formed with a transparent electrode 7 on the upper side thereof, and a liquid crystal layer 4 interposed between these glass substrates 1 and 8. An alignment film 3 is formed on the underside of the transparent electrode 2, while an alignment film 6 formed on the upper side of the transparent electrode 7. Liquid crystal molecules have been filled into a gap between these alignment films 3 and 6 to be formed into a liquid crystal layer 4. The alignment layers 3 and 6 have been subjected to alignment treatment to align the liquid crystal molecules in parallel with one another and in the same direction. The thickness of the liquid crystal layer 4 is maintained with spacers 5.

The glass substrate 1 is provided with a sheet polarizer 13 on the upper side thereof, while the glass substrate 8 provided with a sheet polarizer 16 on the underside thereof, the sheet polarizers 13 and 16 being arranged in a cross nicol position. Further, a retardation plate 17 is provided between the sheet polarizer 13 and the glass substrate 1, while a retardation plate 18 provided between the sheet polarizer 16 and the glass substrate 8. A negative retardation plate having a hybrid-aligned primary axis is employed for each of the retardation plates 17 and 18.

The OCB embodiment liquid crystal display element thus constructed is characterized in that transition of the alignment condition of liquid crystal molecules from a splay alignment 4a to a bend alignment 4b is caused by application of a voltage to allow an image to be displayed with the molecules in the bend alignment condition. Such an OCB embodiment liquid crystal device exhibits considerably improved liquid crystal responsiveness as compared with TN (Twisted Nematic) embodiment liquid crystal display elements and the like and hence can realize a liquid crystal display suited for motion picture display. Further, the provision of the retardation plates 17 and 18 makes it possible to realize low-voltage drive and a wide viewing angle.

Meanwhile, the aforementioned OCB embodiment liquid crystal display element may be constructed to include color filters for the three primary colors (red, green and blue) for realizing a color display. Pixels corresponding to respective color filters for red, green and blue are herein referred to as red pixel(s), green pixel(s) and blue pixel(s), respectively. FIG. 25 is a graph showing wavelength dispersion characteristics in accordance with retardations in a normal direction of liquid crystal layers, respectively, associated with such red pixel, green pixel and blue pixel (hereinafter referred to as normal-direction retardation(s)). FIG. 25 also shows the normal-direction retardation of a negative retardation plate having a hybrid-aligned primary axis, together with the normal-direction retardations of these liquid crystal layers.

In FIG. 25, reference numerals 81, 82 and 83, respectively, indicate wavelength dispersion characteristics in accordance with normal-direction retardations of the liquid crystal layers, respectively, associated with the red pixel, green pixel and blue pixel. Reference numeral 84 indicates the wavelength dispersion characteristic in accordance with normal-direction retardations of the aforementioned negative retardation plate.

As shown in FIG. 25, the normal-direction retardation of the liquid crystal layer associated with the red pixel generally conforms to that of the negative retardation plate in a wavelength region corresponding to red (in the vicinity of 650 nm). Likewise, the normal-direction retardation of the liquid crystal layer associated with the green pixel generally conforms to that of the negative retardation plate in a wavelength region corresponding to blue (in the vicinity of 550 nm). However, the normal-direction retardation of the liquid crystal layer associated with the blue pixel does not conform to that of the negative retardation plate in a wavelength region corresponding to blue (in the vicinity of 450 nm). Thus, there arises a problem that when the OCB embodiment liquid crystal display element makes a black display, the display becomes bluish.

DISCLOSURE OF INVENTION

The present invention has been made in view of the foregoing circumstances and intends to provide an OCB embodiment liquid crystal display element capable of making a favorable black display by decreasing bluishness when a black display is made, a liquid crystal display including the OCB embodiment liquid crystal display element, and a method of manufacturing the liquid crystal display element.

With a view to attaining these objects, the present invention provides a liquid crystal display comprising a liquid crystal display element having a liquid crystal layer containing liquid crystal molecules oriented so as to assume a bend alignment when an image display is being made, and at least one retardation plate for compensating for a retardation of the liquid crystal layer, wherein the display is made by varying the retardation of the liquid crystal layers in accordance with video signals inputted from outside to vary the transmittance of the liquid crystal display element to light for display, characterized in that: the liquid crystal display element includes a plurality of red pixels for displaying a red color, a plurality of green pixels for displaying a green color, and a plurality of blue pixels for displaying a blue color; and a thickness of the liquid crystal layer associated with the blue pixels is larger than a thickness of the liquid crystal layer associated with the red pixels and/or the green pixels.

With such a construction, the retardation of the liquid crystal layer associated with the blue pixels and that of the retardation plate substantially conform to each other in a wavelength region corresponding to blue. Thus, it is possible to decrease bluishness that occurs when a black display is made. Accordingly, a favorable black display can be realized.

In this case, a difference between the thickness of the liquid crystal layer associated with the blue pixels and thickness of the liquid crystal layer associated with the red pixels and/or the green pixels may be not less than 0.2 µm and not more than 1.0 µm. Alternatively, the thickness of the liquid crystal layer associated with the blue pixels may be not less than 104% and not more than 120% of the thickness of the liquid crystal layer associated with the red pixels and/or the green pixels.

By thus adjusting the thickness of the liquid crystal layer associated with the blue pixels to a suitable value, it is possible to decrease bluishness in a black display sufficiently.

The liquid crystal display according to the present invention may further comprise a lighting device having light sources for emitting a red light, a green light and a blue light, respectively, and lighting device control means for controlling the lighting device in a manner to cause the light sources to emit respective color lights by time division. This arrangement allows even a so-called field sequential color system to realize a favorable black display.

According to the present invention, there is provided a liquid crystal display comprising a liquid crystal display element having a liquid crystal layer containing liquid crystal molecules oriented so as to assume a bend alignment when an image display is being made, and at least one retardation plate for compensating for a retardation of the liquid crystal layer, wherein the display is made by varying the retardation of the liquid crystal layer in accordance with video signals inputted from outside to vary the transmittance of the liquid crystal display element to light for display, characterized in that: the liquid crystal display element includes a plurality of red pixels for displaying a red color, a plurality of green pixels for displaying a green color, and a plurality of blue pixels for displaying a blue color; and an alignment direction of the liquid crystal molecules associated with the blue pixels is different from an alignment direction of the liquid crystal molecules associated with the red pixels and/or the green pixels.

Such a construction makes it possible to control the voltage-transmittance characteristic associated with the blue pixels. As a result, it is possible to decrease the bluishness that occurs when a black display is made.

In this case, the alignment direction of the liquid crystal molecules associated with the blue pixels may form an angle of not less than 2 degrees and not more than 30 degrees with respect to the alignment direction of the liquid crystal molecules associated with the red pixels and/or the green pixels. This feature makes it possible to decrease bluishness that occurs when a black display is made without lowering display characteristics including a viewing angle characteristic and a luminance.

The liquid crystal display according to the present invention may further comprise a lighting device having light sources for emitting a red light, a green light and a blue light, respectively, and lighting device control means for controlling the lighting device in a manner to cause the light sources to emit respective color lights by time division. This arrangement allows even a so-called field sequential color system to realize a favorable black display.

According to the present invention, there is provided a liquid crystal display comprising a liquid crystal display element having a liquid crystal layer containing liquid crystal molecules oriented so as to assume a bend alignment when an image display is being made, and at least one retardation plate for compensating for a retardation of the liquid crystal layer, wherein the display is made by varying the retardation of the liquid crystal layer in accordance with video signals inputted from outside to vary the transmittance of the liquid crystal display element to light for display, characterized in that: the liquid crystal display element includes a plurality of red pixels for displaying a red color, a plurality of green pixels for displaying a green color, and a plurality of blue pixels for displaying a blue color; and a pretilt angle of the liquid crystal molecules associated with the blue pixels is different from each of pretilt angles of the liquid crystal molecules associated with the red pixels and the green pixels, while the pretilt angle of the liquid crystal molecules associated with the red pixels is substantially equal to the pretilt angle of the liquid crystal molecules associated with the green pixels.

Such a construction makes it possible to control the voltage-transmittance characteristic associated with the blue pixels. As a result, it is possible to decrease the bluishness that occurs when a black display is made.

In this case, the pretilt angle of the liquid crystal molecules associated with the blue pixels may be smaller than each of the pretilt angles of the liquid crystal molecules associated with the red pixels and the green pixels. Alternatively, the pretilt angle of the liquid crystal molecules associated with the blue pixels may be not less than 5% and not more than 50% of each of the pretilt angles of the liquid crystal molecules associated with the red pixels and the green pixels.

The liquid crystal display according to the present invention may further comprise a lighting device having light sources for emitting a red light, a green light and a blue light, respectively, and lighting device control means for controlling the lighting device in a manner to cause the light sources to emit respective color lights by time division. This arrangement allows even a so-called field sequential color system to realize a favorable black display.

According to the present invention, there is provided a liquid crystal display comprising a liquid crystal display element having a liquid crystal layer containing liquid crystal molecules oriented so as to assume a bend alignment when an image display is being made, and at least one retardation plate for compensating for a retardation of the liquid crystal layer, wherein the display is made by varying the retardation of the liquid crystal layer in accordance with video signals inputted from outside to vary the transmittance of the liquid crystal display element to light for display, characterized in that the liquid crystal molecules have an refractive index anisotropy of 0.15 or more, while the product of the refractive index anisotropy and the thickness of the liquid crystal layer is 0.80 µm or less.

According to the present invention, there is provided a liquid crystal display comprising a liquid crystal display element having a liquid crystal layer containing liquid crystal molecules oriented so as to assume a bend alignment when an image display is being made, and at least one retardation plate for compensating for a retardation of the liquid crystal layer, wherein the display is made by varying the retardation of the liquid crystal layer in accordance with video signals inputted from outside to vary the transmittance of the liquid crystal display element to light for display, characterized in that: the liquid crystal display element has a negative uniaxial retardation plate comprising a triacetylcellulose film; and the triacetylcellulose film has refractive indexes along three axes thereof, any one of the refractive indexes being not less than 1.45 and not more than 1.50.

In this case, the negative uniaxial retardation plate may further comprise a discotic liquid crystal film. This feature makes it possible to control the wavelength dispersion characteristic of the negative uniaxial retardation plate easily and hence to approximate it to the wavelength dispersion characteristic of the liquid crystal layer. As a result, it is possible to decrease bluishness when a black display is made.

According to the present invention, there is provided a liquid crystal display comprising a liquid crystal display element having a liquid crystal layer containing liquid crystal molecules oriented so as to assume a bend alignment when an image display is made, and at least one retardation plate for compensating for a retardation of the liquid crystal layer, wherein the display is made by varying the retardation of the liquid crystal layer in accordance with video signals inputted from outside to vary the transmittance of the liquid crystal display element to light for display, characterized in that: the liquid crystal display element has a biaxial retardation plate comprising a triacetylcellulose film; and the triacetylcellulose film has refractive indexes along three axes thereof, any one of the refractive indexes being not less than 1.45 and not more than 1.50.

With such a construction, it is possible to inhibit leakage of obliquely incident light when a black display is made without the necessity of providing a positive uniaxial retardation plate as well as to decrease bluishness of the black display.

According to the present invention, there is provided a liquid crystal display comprising: a liquid crystal display element having a liquid crystal layer containing liquid crystal molecules oriented so as to assume a bend alignment when an image display is being made, and at least one retardation plate for compensating for a retardation of the liquid crystal layer; and a lighting device for emitting light outgoing to the liquid crystal display element, wherein the display is made by varying the retardation of the liquid crystal layer in accordance with video signals inputted from outside to vary the transmittance of the liquid crystal display element to the light outgoing from the lighting device for display, characterized in that: the liquid crystal display element includes a plurality of red pixels for displaying a red color, a plurality of green pixels for displaying a green color, and a plurality of blue pixels for displaying a blue color; and the lighting device is configured to substantially equalize outgoing light amounts in respective wavelength regions corresponding to red, green and blue.

In this case, the lighting device may have a light source for emitting the outgoing light, and a filter for filtering the outgoing light emitted from the light source in a manner that the half width of a spectrum of the outgoing light in the wavelength region corresponding to blue is 30 nm or less.

In the liquid crystal display according to the foregoing invention, an arrangement is possible such that the lighting device has light sources for emitting a red light, a green light and a blue light, respectively, and that the liquid crystal display further comprises lighting device control means for controlling the lighting device in a manner to cause the light sources to emit respective color lights by time division. This arrangement allows even a so-called field sequential color system to realize a favorable black display.

In the liquid crystal display according to the foregoing invention, the lighting device may have a light-emitting diode for emitting the outgoing light, or otherwise the lighting device may have an electroluminescent device for emitting the outgoing light.

According to the present invention, there is provided a method of manufacturing a liquid crystal display including a liquid crystal display element having a liquid crystal cell comprising a liquid crystal layer sandwiched between a pair of opposed substrates, the liquid crystal layer containing liquid crystal molecules oriented so as to assume a bend alignment when an image display is being made, and at least one retardation plate for compensating for a retardation of the liquid crystal layer, the liquid crystal cell having a plurality of red pixels for displaying a red color, a plurality of green pixels for displaying a green color and a plurality of blue pixels for displaying a blue color, wherein the display is made by varying the retardation of the liquid crystal layer in accordance with video signals inputted from outside to vary the transmittance of the liquid crystal display element to light outgoing from the lighting device for display, characterized by comprising the steps of: forming a photosensitive photoresist film having a predetermined thickness on an inwardly oriented face of one of the pair of substrates; etching the photosensitive photoresist film thus formed in regions corresponding to the blue pixels so that the thickness of said one of the substrates in the regions corresponding to the blue pixels has a smaller thickness than the thickness of said one of the substrates in regions corresponding to the red pixels and/or the green pixels; and bonding said one of the substrates thus etched and the other substrate to each other in an opposed fashion to allow the liquid crystal layer to be formed so that a thickness of the liquid crystal layer associated with the blue pixels becomes larger than a thickness of the liquid crystal layer associated with the red pixels and/or the green pixels.

This method enables easy manufacture of a liquid crystal display wherein a thickness of a liquid crystal layer associated with blue pixels is larger than a thickness of the liquid crystal layer associated with the red pixels and/or the green pixels.

In this case, the predetermined thickness may be not less than 0.2 μm and not more than 1.0 μm. By so setting, it is possible to easily manufacture a liquid crystal display wherein a thickness of a liquid crystal layer associated with blue pixels is larger by not less than 0.2 μm and not more than 1.0 μm than a thickness of the liquid crystal layer associated with the red pixels and/or the green pixels.

According to the present invention, there is provided a method of manufacturing a liquid crystal display including a liquid crystal display element having a liquid crystal cell comprising a liquid crystal layer sandwiched between a pair of opposed substrates, the liquid crystal layer containing liquid crystal molecules oriented so as to assume a bend alignment when an image display is being made, and at least one retardation plate for compensating for a retardation of the liquid crystal layer, the liquid crystal cell having a plurality of red pixels for displaying a red color, a plurality of green pixels for displaying a green color and a plurality of blue pixels for displaying a blue color, wherein the display is made by varying the retardation of the liquid crystal layer in accordance with video signals inputted from outside to vary the transmittance of the liquid crystal display element to light outgoing from the lighting device for display, characterized by comprising the steps of: forming a photosensitive alignment film on an inwardly oriented face of each of the pair of substrates; and subjecting the alignment film to an alignment treatment by irradiating the alignment film with linearly polarized light, wherein at the step of the alignment treatment, the photosensitive alignment film in regions corresponding to the blue pixels are irradiated with linearly polarized light having a different polarization direction from that of linearly polarized light with which the photosensitive alignment film in regions corresponding to the red pixels and/or the green pixels is irradiated, whereby an alignment direction of the liquid crystal molecules associated with the blue pixels becomes different from an alignment direction of the liquid crystal molecules associated with the red pixels and/or the green pixels.

According to the present invention, there is further provided a method of manufacturing a liquid crystal display including a liquid crystal display element having a liquid crystal cell comprising a liquid crystal layer sandwiched between a pair of opposed substrates, the liquid crystal layer containing liquid crystal molecules oriented so as to assume a bend alignment when image display is being made, and at least one retardation plate for compensating for a retardation of the liquid crystal layer, the liquid crystal cell having a plurality of red pixels for displaying a red color, a plurality of green pixels for displaying a green color and a plurality of blue pixels for displaying a blue color, wherein the display is made by varying the retardation of the liquid crystal layer in accordance with video signals inputted from outside to vary the transmittance of the liquid crystal display element to light outgoing from the lighting device for display, characterized by comprising the steps of: forming an alignment film on an inwardly oriented face of each of the pair of substrates; rubbing the alignment film thus formed; and irradiating the alignment film with light while varying the amount of the light before or after the rubbing step so that a pretilt angle of the liquid crystal molecules associated with the blue pixels becomes different from each of pretilt angles of the liquid crystal molecules associated with the red pixels and the green pixels.

The foregoing and other objects, features and advantages of the present invention will become apparent from the following detailed description of the preferred embodiments of the present invention when read with reference to the accompanying drawings.

BRIEF DESCRIPTION OF DRAWINGS

FIG. 2(a) is a sectional view of the liquid crystal cell, while FIG. 2(b) is an enlarged view of a liquid crystal layer portion in the sectional view.

FIG. 16 is a diagram showing the relation between the combination of refractive index anisotropy Δn of a liquid crystal material and retardation Δnd and the bluishness that occurs when a black display is made.

FIGS. 20(a) and 20(b) are graphs showing spectra obtained with and without the provision of an interference filter 152, respectively.

BEST EMBODIMENT FOR CARRYING OUT THE INVENTION

Hereinafter, embodiments for carrying out the present invention will be described in detail with reference to the drawings. It should be noted that in the following embodiments the color coordinates of a display in the direction normal to a liquid crystal display element are measured when the liquid crystal display element is making a black display. In this case the display becomes the best achromatic display with no coloring when the color coordinates assume substantially (0.3, 0.3). Therefore, the present invention intends to approximate the color coordinates to (0.3, 0.3) in order to realize a favorable black display.

Embodiment 1

According to embodiment 1 for carrying out the present invention, there is provided a liquid crystal display wherein a thickness of a liquid crystal layer associated with blue pixels for a blue display is made larger than each of thicknesses of the liquid crystal layer associated with red pixels for a red display and green pixels for a green display, thereby decreasing bluishness of a black display.

EXAMPLE 1

Figure 1:
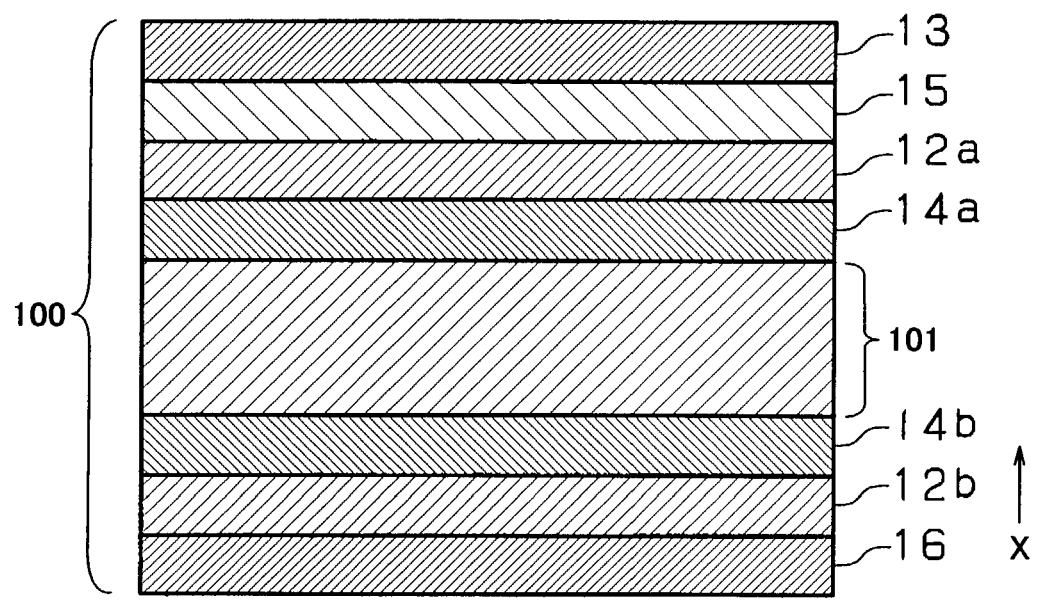
FIG. 1 is a sectional view schematically showing the construction of a liquid crystal display element included in a liquid crystal display according to embodiment 1 for carrying out the present invention.

FIG. 1 is a sectional view schematically showing the construction of a liquid crystal display element included in a liquid crystal display according to example 1 of embodiment 1 for carrying out the present invention. For convenience, the X direction in the figure indicates an ascending direction of the liquid crystal display element.

As shown in FIG. 1, the liquid crystal display element 100 included in the liquid crystal display according to example 1 has a liquid crystal cell 101 to be described later. On the upper side of the liquid crystal cell 101 are sequentially stacked a retardation film 14a comprising an optical medium having a hybrid-aligned primary axis and a negative refractive index anisotropy (hereinafter referred to as "negative retardation film" simply"), a negative uniaxial retardation film 12a, a positive uniaxial retardation film 15, and an analyzer 13. On the underside of the liquid crystal cell 101 are sequentially stacked a negative retardation film 14b, a negative uniaxial retardation film 12b, and a polarizer 16.

Figure 2:
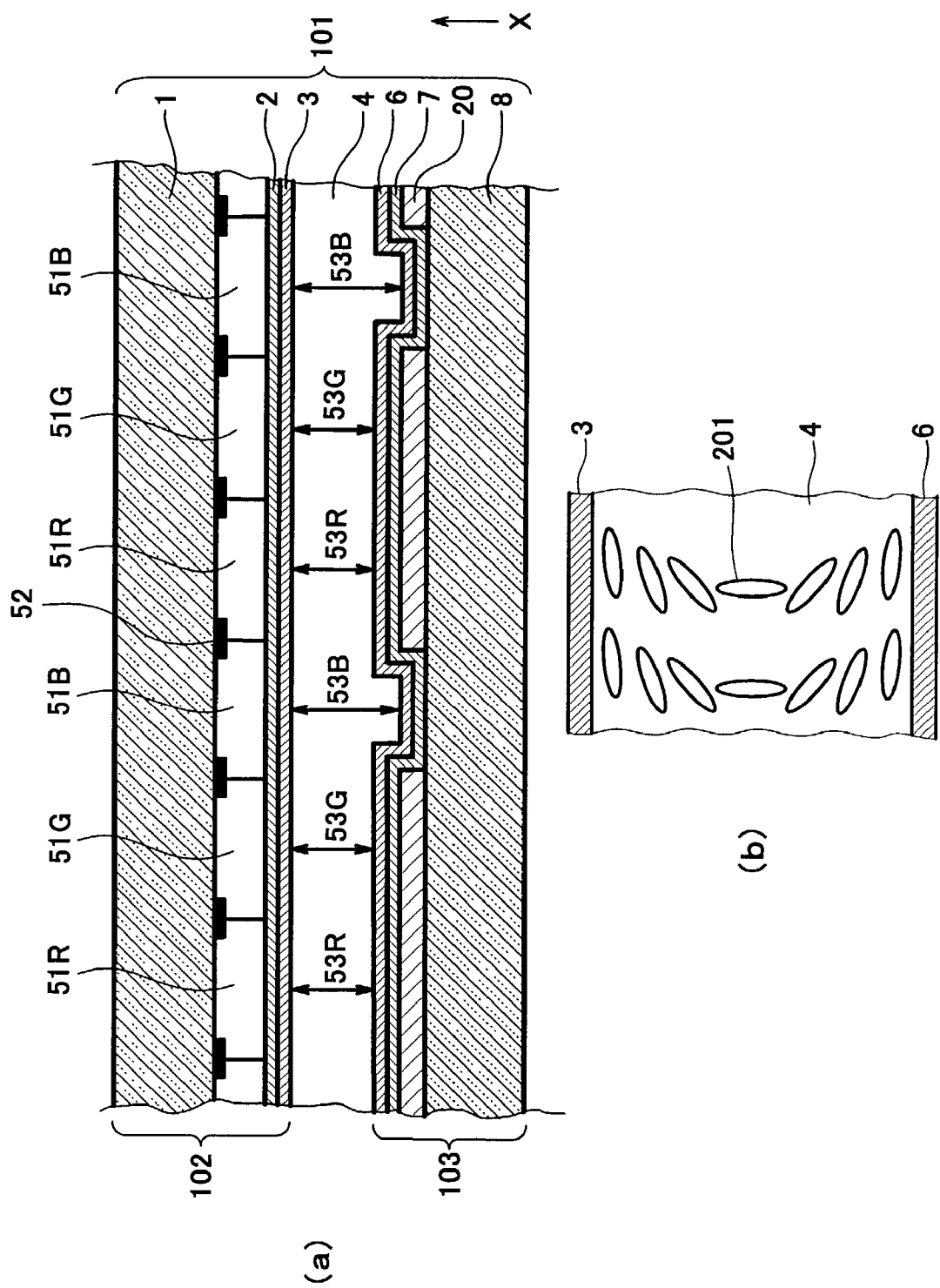
FIG. 2 includes views schematically showing the arrangement of a liquid crystal cell included in the liquid crystal display element of the liquid crystal display according to embodiment 1; specifically.

FIG. 2 includes views each schematically showing the arrangement of the aforementioned liquid crystal cell 101; specifically, FIG. 2(a) is a sectional view of the liquid crystal cell 101, while FIG. 2(b) is an enlarged view of a liquid crystal layer portion in the sectional view. As shown in FIG. 2(a), the liquid crystal cell 101 includes a pair of substrates, that is, an upper substrate 102 and a lower substrate 103. The upper substrate 102 and the lower substrate 103 are disposed to face each other through spacers (not shown), and a liquid crystal layer 4 is disposed in the clearance defined between the upper substrate 102 and the lower substrate 103. Into the liquid crystal layer 4 are injected liquid crystal molecules 201, which assume a bend alignment as shown in FIG. 2(b) when an image display is being made.

The upper substrate 102 comprises a transparent electrode 2 and an alignment film 3 which are formed and stacked sequentially on the underside of a glass substrate 1. Between the glass substrate 1 and the transparent electrode 2 are formed red color filters 51R, green color filters 51G and blue color filters 51B. A light-shielding film 52 called a black matrix is disposed at the boundary between adjacent color filters of respective colors. Hereinafter, pixels corresponding to red color filter 51R, green color filter 51G and blue color filter 51B will be referred to as red pixel, green pixel and blue pixel, respectively.

The lower substrate 103, on the other hand, comprises a transparent electrode 7 and an alignment film 6 which are formed and stacked sequentially on the upper side of a glass substrate 8. The lower substrate 103 has dented portions 10 at locations corresponding to blue pixels. Reference numeral 20 denotes a resist thin film to be described later.

Figure 3:
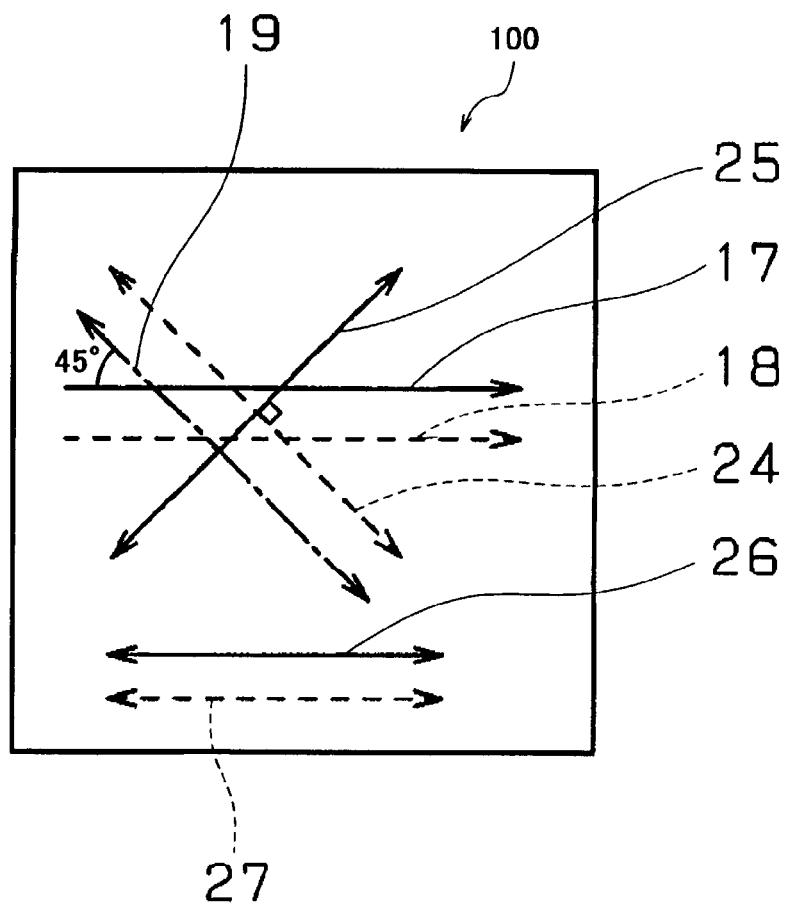
FIG. 3 is a plan view of the liquid crystal display element included in the liquid crystal display according to embodiment 1 for indicating the directions in which optical devices included in the liquid crystal display element are disposed.

FIG. 3 is a plan view of the liquid crystal display element 100 for indicating the directions in which optical devices included in the liquid crystal display element 100 are disposed. Referring to FIG. 3 as well as FIG. 1, arrows 17 and 18 indicate the directions of alignment treatments done on the upper substrate 102 and the lower substrate 103, respectively. Arrows 26 and 27, respectively, indicate the primary axial directions of the negative retardation films 14a and 14b. As shown in FIG. 3, the negative retardation films 14a and 14b are disposed so that their respective primary axial directions 26 and 27 conform to the alignment treatment directions 17 and 18.

Arrow 19 in FIG. 3 indicates the slow axis of the positive uniaxial retardation film 15. As shown in FIG. 3, the positive uniaxial retardation film 15 is disposed so that its slow axis 19 forms an angle of 45 degrees with respect to the alignment treatment directions 17 and 18.

Further, arrows 24 and 25 in FIG. 3 indicate the transmission axes of the polarizer 16 and the analyzer 13, respectively. As shown in FIG. 3, the polarizer 16 is disposed so that its transmission axis 24 extends in the same direction as the slow axis 19 of the positive uniaxial retardation film 15. On the other hand, the polarizer 13 is disposed so that its transmission axis 25 perpendicularly intersects the transmission axis 24 of the polarizer 16.

Figure 4:
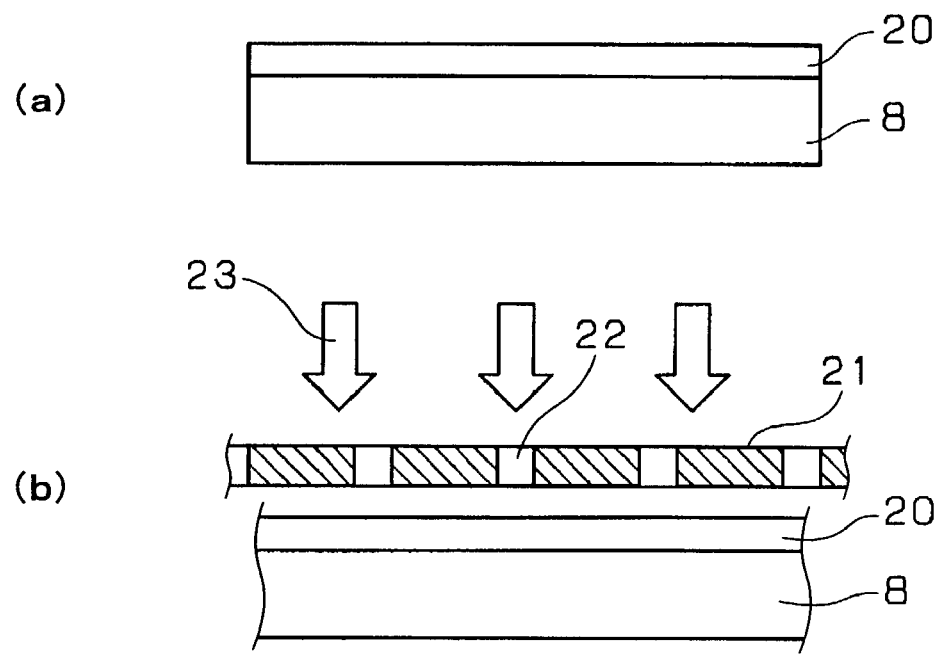
FIG. 4 is a view illustrating the process of forming a dented structural body included in the liquid crystal display element of the liquid crystal display according to embodiment 1.
Figure 5:
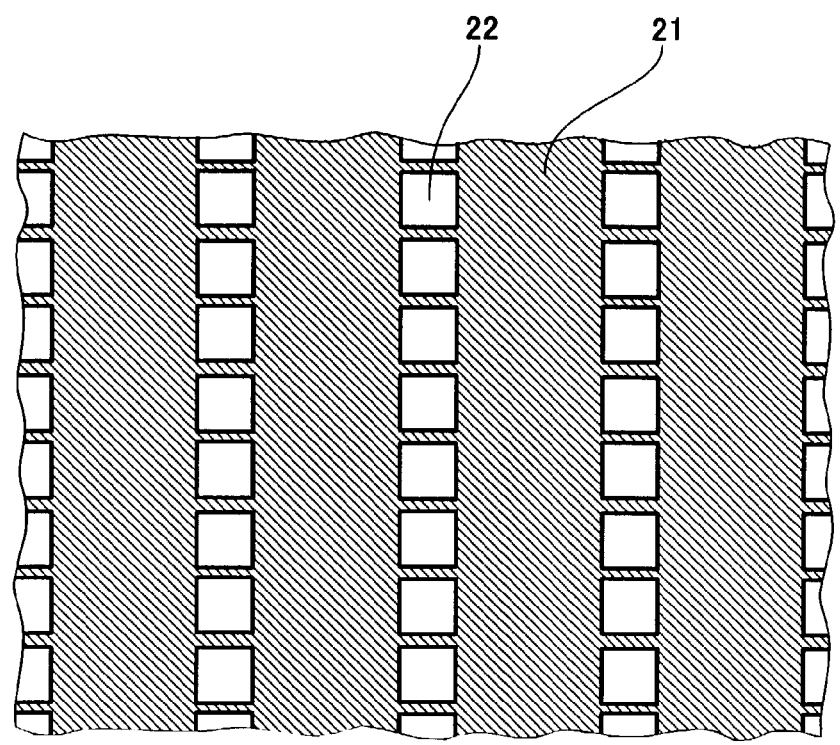
FIG. 5 is a plan view showing a photo mask used in the formation of dented portions.
Figure 6:
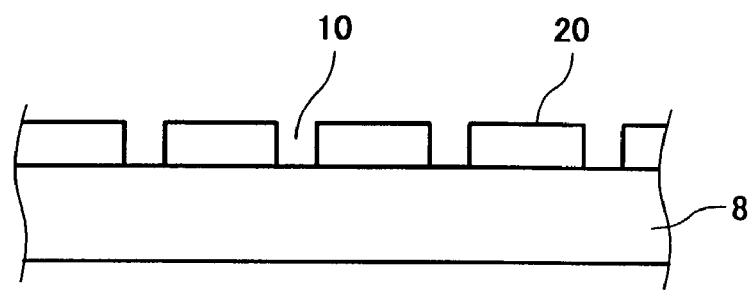
FIG. 6 is a view illustrating the process of forming dented portions included in the liquid crystal display element of the liquid crystal display according to embodiment 1.

In this example, the aforementioned liquid crystal display element 100 was manufactured as follows. FIG. 4 is a view illustrating the process of forming the aforementioned dented portions 10. First, a polycarbonate (PC) type resist material produced by JSR Co., Ltd. was applied onto the upper side of the glass substrate 8 to form the resist thin film 20 having a thickness of 0.5 μm. Subsequently, a photo mask 21 having a plurality of openings 22 in rectangular patterns as shown in FIG. 5 was superposed on the resist thin film 20, and the resulting structure was exposed to parallel ultraviolet rays 23 by irradiation. The resist thin film 20 thus exposed was developed, rinsed and then prebaked at 90° C. to form the dented portions 10 as shown in FIG. 6.

The aforementioned openings 22 of the photo mask 21 are positioned corresponding to the locations of the blue pixels. Accordingly, the aforementioned dented portions 10 are formed corresponding to the blue pixels.

After the plurality of dented portions 10 had been thus formed, the transparent electrode 7 having a thickness of 2000 Å was formed by a known technique. Subsequently, the underside of the transparent electrode 2 and the upper side of the transparent electrode 7 were coated with an alignment film-forming coating material SE-7492 produced by NISSAN CHEMICAL INDUSTRIES, LTD. by a spin coating process, which in turn was baked at 180° C. for one hour and then cured to form the alignment films 3 and 6.

The alignment films 3 and 6 thus formed were rubbed in respective alignment treatment directions 17 and 18 indicated in FIG. 3. Subsequently, the upper substrate 102 and the lower substrate 102 were bonded to each other so that a spacing therebetween associated with the red pixels and green pixels, that is, a thickness of liquid crystal layer 4 (indicated at 53R and 53G in FIG. 2), assumed 5.2 μm with use of spacers produced by SEKISUI FINE CHEMICAL Co., Ltd. and a sealing resin named STRUCT BOND 352A produced by MITSUI TOUATSU KAGAKU Co., Ltd. In this case, a thickness (indicated at 53B in FIG. 2) of liquid crystal layer 4 associated with the blue pixels assumed 5.7 μm, which is the sum of 5.2 μm noted above and 0.5 μm as the thickness of the dented portions 10. Thereafter, a liquid crystal MT-5583 (refractive index anisotropy Δn=0.140) was injected into the liquid crystal layer 4 by a vacuum injection process to complete the liquid crystal cell 101.

Though the thicknesses 53R and 53G of liquid crystal layer 4 associated with the red pixels and the green pixels were adjusted to 5.2 μm in this example, the present invention is not limited to this feature. However, if the difference between the thicknesses 53R and 53G of liquid crystal layer 4 associated with the red pixels and the green pixels and the thickness 53B of liquid crystal layer 4 associated with the blue pixels is too small, the retardation of liquid crystal layer 4 at the blue pixels cannot become sufficiently large. On the other hand, if the difference in thickness is too large, the retardation of liquid crystal layer 4 at the blue pixels becomes so large that a favorable display cannot be obtained. For this reason, the difference in thickness is desirably not less than about 0.2 μm and not more than about 1.0 μm. Stated otherwise, the difference in thickness is desirably not less than about 4% and not more than about 20% of each of the thicknesses 53R and 53G of liquid crystal layer 4 associated with the red pixels and the green pixels. That is, the thickness 53B of liquid crystal layer 4 associated with the blue pixels is desirably not less than about 104% and not more than about 120% of each of the thicknesses 53R and 53G of liquid crystal layer 4 associated with the red pixels and the green pixels.

On the upper side of the liquid crystal cell 101 thus fabricated were sequentially stacked the negative retardation film 14a, negative uniaxial retardation film 12a, positive uniaxial retardation film 15 and analyzer 13, and on the underside of the liquid crystal cell 101 were sequentially stacked the negative retardation film 14a, negative uniaxial retardation film 12b and polarizer 16, whereby the liquid crystal display element 100 was completed.

Retardation Re in the plane of each of the negative retardation films 14a and 14b was 36 nm, which was found from the following formula (1), and retardation Re in the plane of the positive uniaxial retardation film 15 was 150 nm, which was found in the same manner. Similarly, retardation Rth in the thicknesswise direction of each of the negative uniaxial retardation films 12a and 12b was 175 nm.

$$Re = (nx - ny) \times d \quad (1)$$

$$Rth = ((nx + ny)/2 - nz) \times d \quad (2)$$

wherein nx and ny each represent a refractive index in a plane, nz represents a refractive index in a thicknesswise direction, and d represents the thickness of a film.

In this example, retardation Δnd of liquid crystal layer 4 defined by the product of thickness d of liquid crystal layer 4 and refractive index anisotropy Δn of liquid crystal molecules 201 was set to 0.73 μm.

Figure 7:
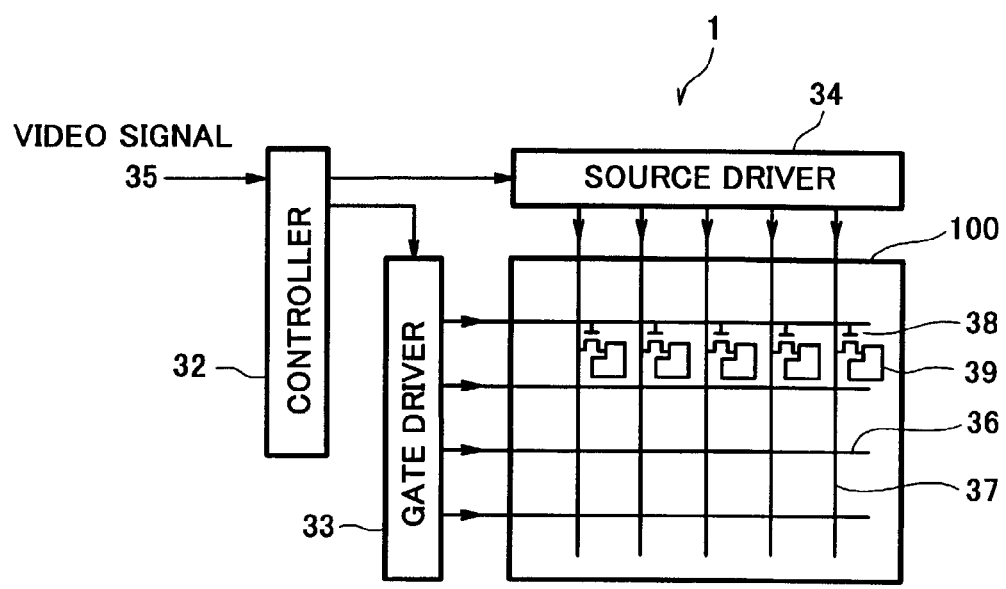
FIG. 7 is a block diagram illustrating the configuration of the liquid crystal display according to embodiment 1.

FIG. 7 is a block diagram showing the configuration of the liquid crystal display including the liquid crystal display element 100 manufactured as above. In FIG. 7, the liquid crystal display 1 is of the TFT (Thin Film Transistor) type comprising the aforementioned liquid crystal display element 100, blocks 32, 33 and 34, and a backlight (not shown) for emitting white light. Referring to FIG. 7 as well as FIG. 2, the lower substrate 103 serves as a TFT substrate. In the TFT substrate, Gate lines 36 and source lines 37 are formed in a matrix pattern, and pixels delimited by these gate lines 36 and source lines 37 are each formed with a pixel electrode 39 and a switching element 38. The liquid crystal display is constructed to drive the gate lines 36 and the source lines 37 by means of a gate driver 33 and a source driver 34, respectively and to control the gate driver 33 and the source driver 34 by means of a controller 22.

In the liquid crystal display 1 thus constructed, the controller 22 outputs control signals to the gate driver 33 and the source driver 34 in response to an video signal 35 inputted from outside. In this case, the gate driver 33 outputs a gate signal to the gate lines 36 to turn ON the switching elements 38 of respective pixels sequentially, while the source driver 34 inputs the video signal to the pixel electrodes 39 of respective pixels through the source lines 37 timely with the switching. This causes liquid crystal molecules 201 to be modulated, so that the transmittance thereof to light outgoing from the backlight varies to allow the user watching the liquid crystal display 1 to view an image corresponding to the video signal 35.

Figure 8:
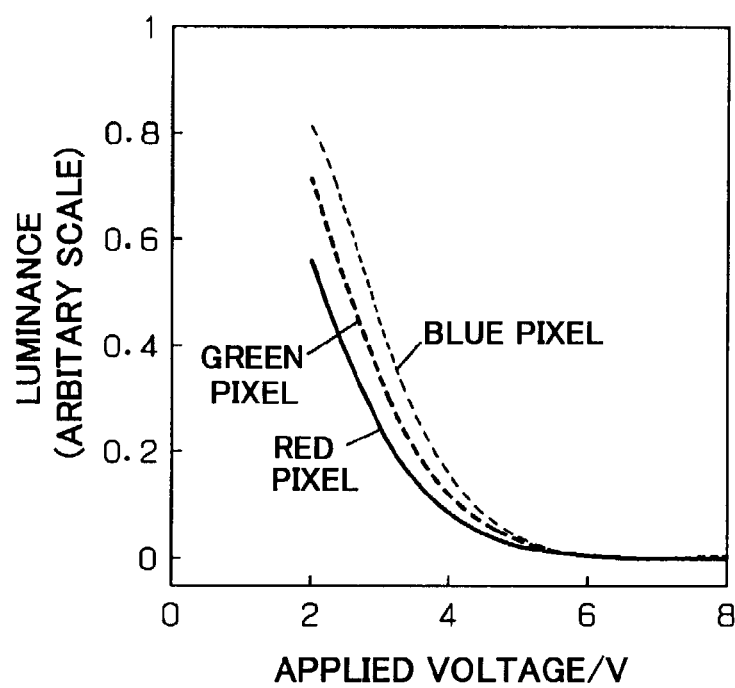
FIG. 8 is a graph showing voltage-luminance characteristics at red pixel, green pixel and blue pixel of the liquid crystal display according to embodiment 1.

FIG. 8 is a graph showing voltage-luminance characteristics at red pixel, green pixel and blue pixel of the liquid crystal display element 100 obtained when an image display is made using the aforementioned liquid crystal display 1. As shown in FIG. 8, the luminance of the blue pixel assumes its lowest value when the applied voltage is 7.2 V, while the luminance of each of the red pixel and the green pixel assumes its lowest value when the applied voltage is 7.1 V. It is to be noted that the voltage required for a white display is determined from a voltage at which the bend alignment inversely transits to the splay alignment. In the case of the liquid crystal display element 100 according to this example, the voltage at which such inverse transition occurred at all the red, green and blue pixels was 2.2 V.

Figure 9:
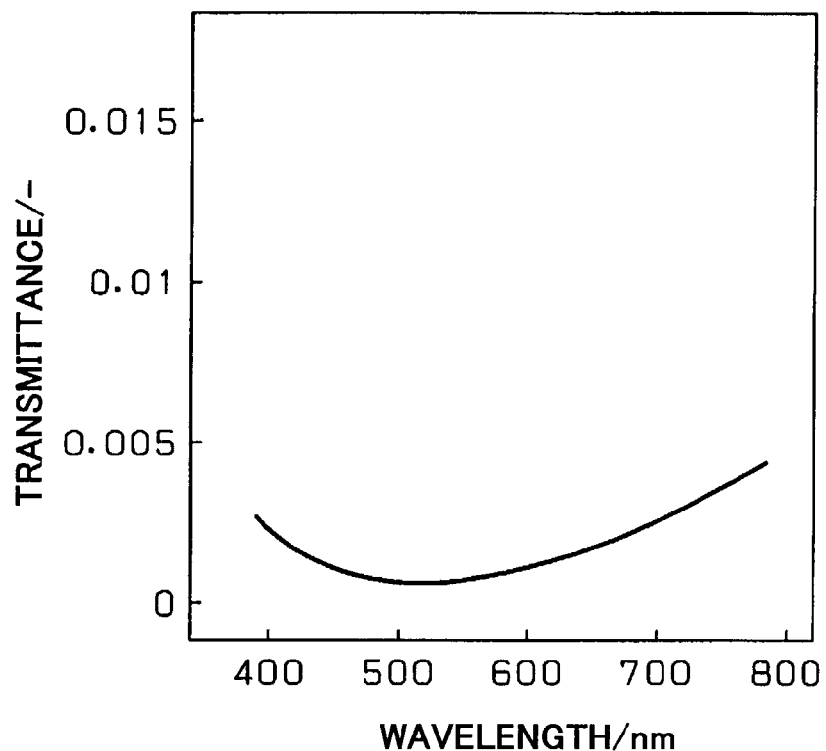
FIG. 9 is a graph showing the spectral distribution of transmitted light normal to a liquid crystal display according to example 1 of embodiment 1 when a black display is made.

FIG. 9 is a graph showing the spectral distribution of transmitted light normal to the liquid crystal display element 100 making a black display. In this case the color coordinates were (0.3120, 0.3227). Since the best achromatic display with no coloring results when the color coordinates are close to about (0.3, 0.3) as described above, it can be understood that this example could realize a favorable black display.

Though retardation $\Delta nd$ is set to 0.73 μm in this example, it is needless to say that retardation $\Delta nd$ is not limited to this value.

Variation 1

Next, a variation of this embodiment will be described. The liquid crystal display according to example 1 is adapted to realize a color display by means of the color filter system. In contrast, a liquid crystal display according to variation 1 is adapted to make a color display by means of the field sequential color system.

Figure 10:
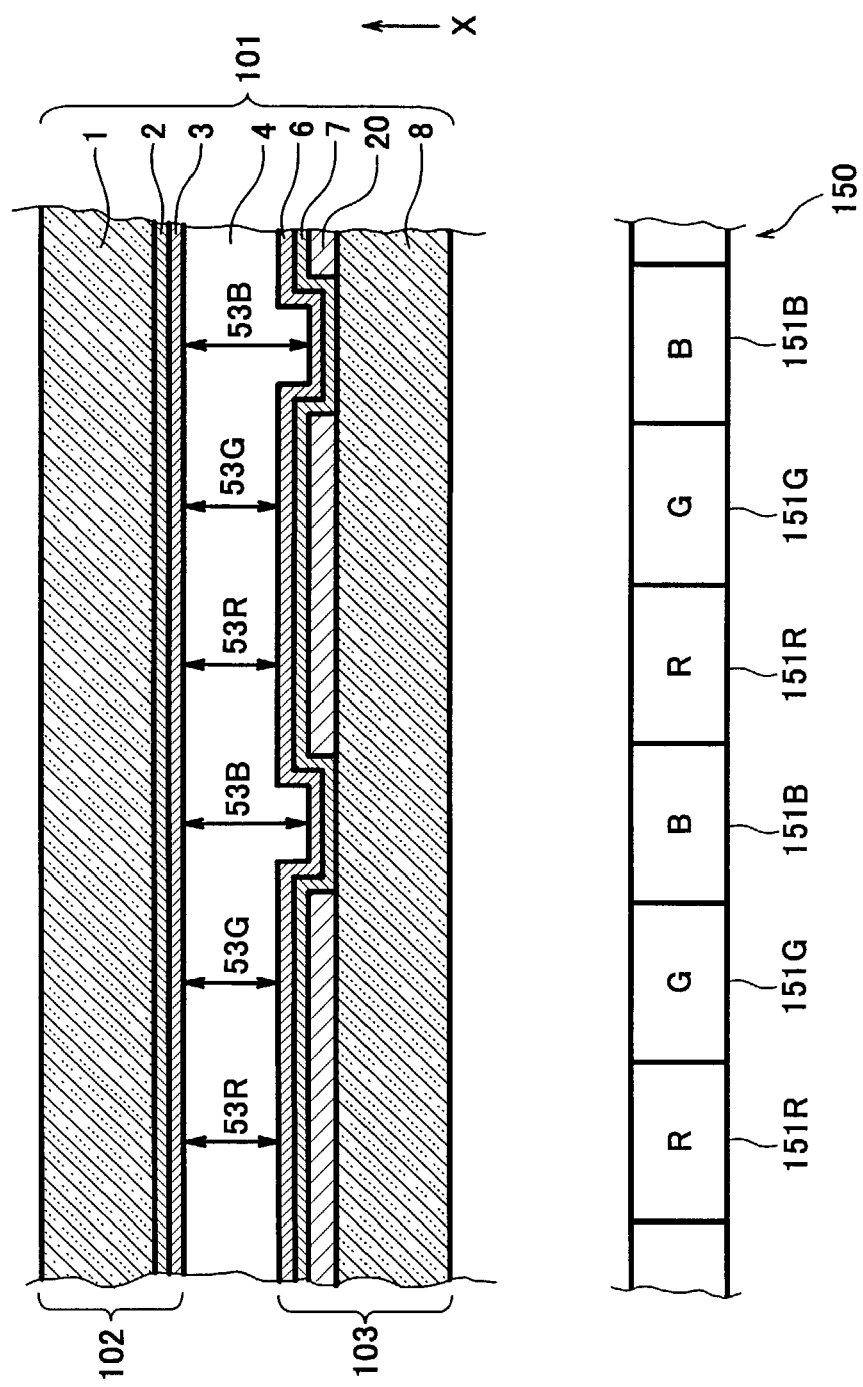
FIG. 10 is a sectional view schematically showing the outline of another arrangement of the liquid crystal display according to embodiment 1.

FIG. 10 is a sectional view schematically showing the outline of an arrangement of the liquid crystal display according to variation 1. As shown in FIG. 10, liquid crystal display element 100 included in the liquid crystal display according to variation 1 is of the same arrangement as liquid crystal display element 100 according to example 1 except that the color filters 51R, 51G and 51B of the three colors are not provided. For this reason, FIG. 10 shows only the arrangement of liquid crystal cell 101 included in the liquid crystal display element 100 of the liquid crystal display according to variation 1 and uses like reference numerals as used in example 1.

The liquid crystal display including such a liquid crystal display element 100 is of the TFT type like example 1 but is different from example 1 in that backlight 150 comprising light-emitting diodes (hereinafter referred to as LEDs) for emitting lights of three colors that are spread all over the backlight with predetermined intervals is provided below the liquid crystal display element 100. Here, the liquid crystal display element 100 and the backlight 150 are disposed so that red pixels, green pixels and blue pixels of the liquid crystal display element 100 correspond to red LEDs 151R, green LEDs 151G and blue LEDs 151B of the backlight 150. The LEDs of respective colors included in the backlight 150 emit a red light, a green light and a blue light in this order by time division to realize a color display.

Like the liquid crystal display of example 1, the liquid crystal display thus arranged was capable of making a black display with decreased bluishness. As a result, a favorable black display could be realized.

Comparative Example 1

In a liquid crystal display element included in a liquid crystal display according to comparative example 1, thicknesses of a liquid crystal layer corresponding to red pixel, green pixel and blue pixel are equal to each other. Since other features are similar to corresponding features of the liquid crystal display element 100 according to example 1, description thereof is omitted.

An image display was made using the liquid crystal display according to comparative example 1, and voltage-luminance characteristics at red pixel, green pixel and blue pixel of the liquid crystal display element were determined in the same manner as in example 1. As a result, the luminance of the blue pixel assumed its lowest value when the applied voltage was 6.7 V, while the luminance of each of the red pixel and the green pixel assumed its lowest value when the applied voltage was 7.1 V.

Figure 11:
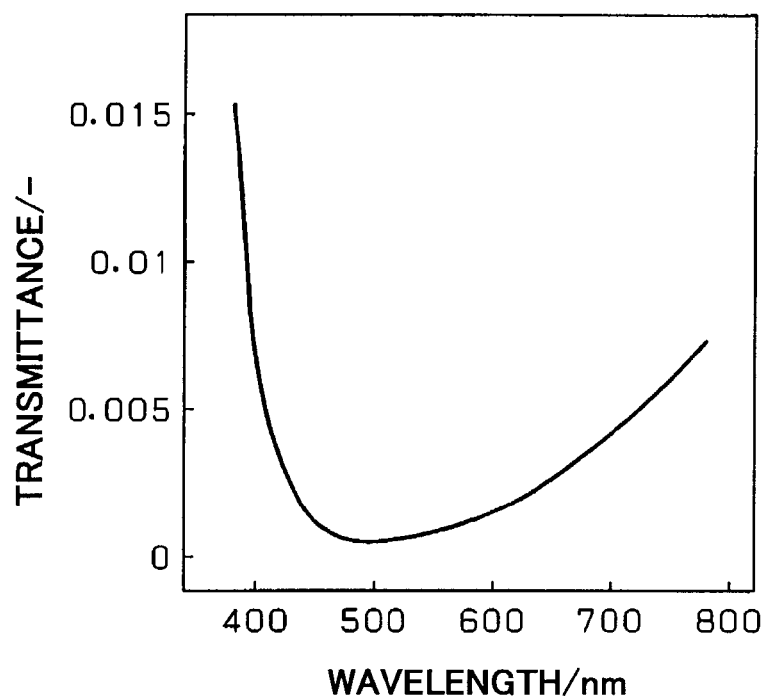
FIG. 11 is a graph showing the spectral distribution of transmitted light normal to a liquid crystal display according to a comparative example.

FIG. 11 is a graph showing the spectral distribution of transmitted light normal to the liquid crystal display according to comparative example 1. The color coordinates in this case assume (0.2035, 0.1607) and, hence, it can be seen therefrom that a black display is tinted blue.

Embodiment 2

According to embodiment 2 for carrying out the present invention, there is provided a liquid crystal display wherein the alignment direction of liquid crystal molecules at blue pixels for a blue display is shifted by a predetermined angle from the alignment direction of liquid crystal molecules at red pixels and green pixels, respectively, for a red display and a green display, thereby decreasing bluishness when a black display is made.

EXAMPLE 2

Figure 12:
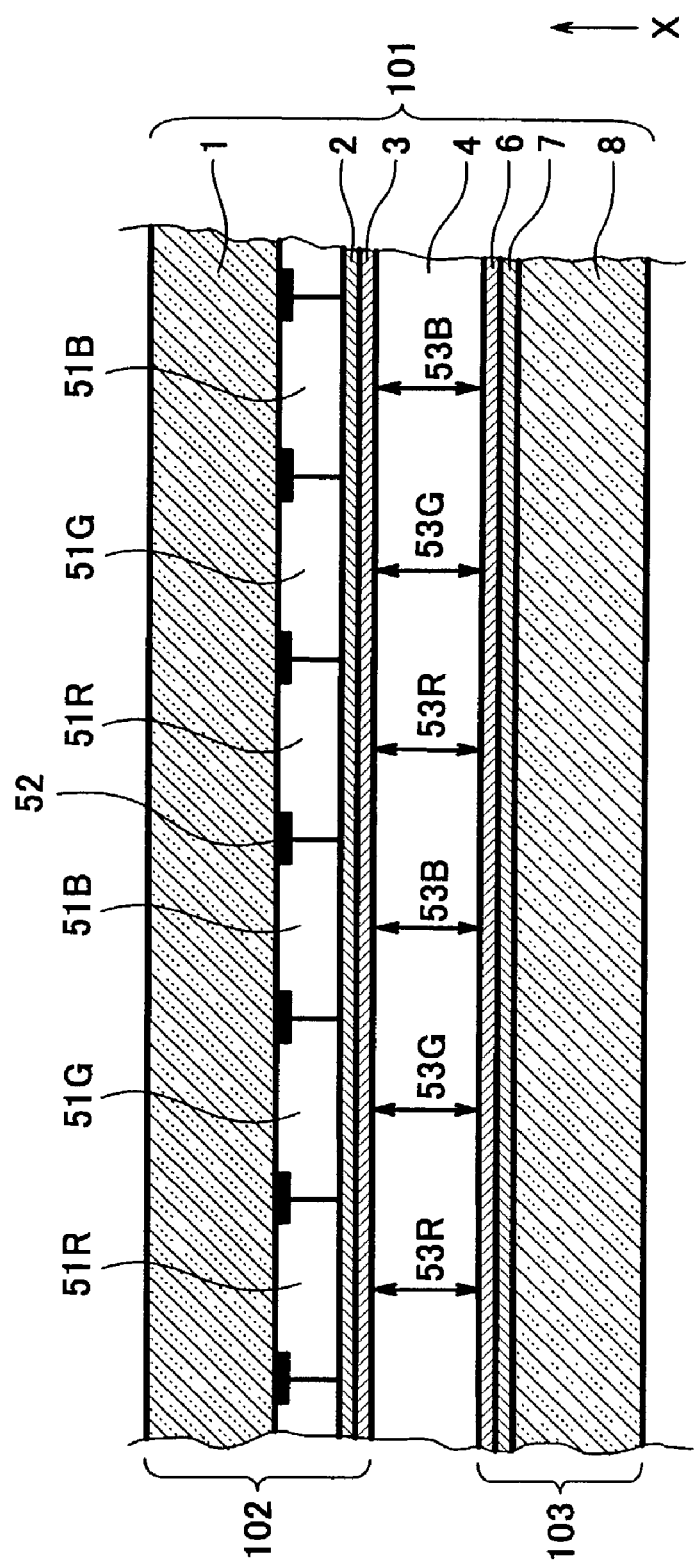
FIG. 12 is a sectional view schematically showing the arrangement of a liquid crystal cell included in a liquid crystal display element of a liquid crystal display according to embodiment 2 for carrying out the present invention.

FIG. 12 is a sectional view schematically showing the arrangement of a liquid crystal cell included in a liquid crystal display element of a liquid crystal display according to embodiment 2 for carrying out the present invention. As shown in FIG. 12, the liquid crystal cell 101 has lower substrate 103 with no dented portion, and thicknesses of liquid crystal layer at red, green and blue pixels are equal to each other, unlike the liquid crystal cell in example 1. Since other features are similar to corresponding features of the liquid crystal cell 101 in example 1, description thereof is omitted by the use of like reference numerals. Also, other features than the liquid crystal cell 101 are similar to corresponding features of the liquid crystal display according to example 1 having been described with reference to FIG. 1 and, hence, description thereof is omitted.

Hereinafter, the process for manufacturing the liquid crystal display element 100 included in the liquid crystal display according to example 2 will be described with reference to FIGS. 1 and 12. First, the underside of transparent electrode 2 and the upper side of transparent electrode 7 were each coated with a polyimide alignment film-forming coating material LPP-JP265CP (solvent: cyclopentanone) produced by Rolic Co. by a spin coating process, which in turn was baked at 150° C. for one hour and then cured to form alignment films 3 and 6.

Figure 13:
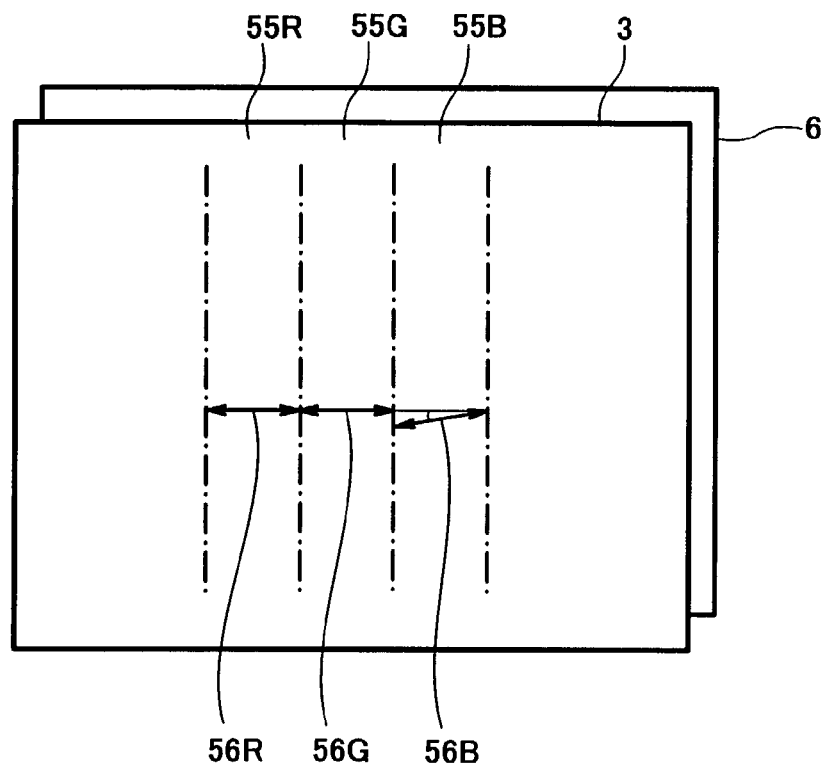
FIG. 13 is an explanatory view indicating polarization directions of ultraviolet light applied to regions corresponding to red pixel, green pixel and blue pixel, respectively in the liquid crystal display element included in the liquid crystal display according to embodiment 2.

The alignment films 3 and 6 thus formed were irradiated with linearly polarized ultraviolet light obliquely at an angle of 30 degrees with respect to the direction normal to the substrate (radiation energy on the substrate was 0.50 J/cm$^2$) for 10 minutes. FIG. 13 is an explanatory view indicating polarization directions of the ultraviolet light applied to regions, respectively, corresponding to red pixel, green pixel and blue pixel. As shown in FIG. 13, polarization direction 56R of ultraviolet light applied to region 55R of each alignment film 3, 6 corresponding to the red pixel is the same as polarization direction 56G of ultraviolet light applied to region 55G corresponding to the green pixel. On the other hand, polarization direction 56B of ultraviolet light applied to region 55B of each alignment film 3, 6 corresponding to the blue pixel forms an angle of 5 degrees with respect to each of the polarization directions 56R and 56G. Therefore, the alignment direction of liquid crystal molecules 201 associated with the blue pixel is different by 5 degrees from each of the alignment directions of liquid crystal molecules 201 associated with the red pixel and green pixel.

Bluishness of a black display decreases as the alignment direction of liquid crystal molecules 201 associated with the blue pixel approximates to the transmission axis of sheet polarizer 16. However, display characteristics including viewing angle characteristic and luminance become lower. For this reason, the angle formed between the polarization direction 56R,56G and the polarization direction 56B, that is, the angle formed between each of the alignment directions of liquid crystal molecules 201 associated with the red pixel and green pixel and the alignment direction of liquid crystal molecules associated with the blue pixel, is suitably not less than about 2 degrees and not more than about 30 degrees, preferably not less than about 5 degrees and not more than about 10 degrees.

Subsequently, upper substrate 102 and lower substrate 103 were bonded to each other so that the spacing therebetween, that is, the thickness of liquid crystal layer 4, assumed 5.8 μm with use of spacers (not shown) produced by SEKISUT FINE CHEMICAL Co., Ltd. and a sealing resin named STRUCT BOND 352A produced by MITSUI TOUATSU KAGAKU Co., Ltd. Thereafter, a liquid crystal MT-5583 (refractive index anisotropy Δn=0.140) was injected into the liquid crystal layer 4 by a vacuum injection process to complete the liquid crystal cell 101. The pretilt angle of liquid crystal molecules at the interface with each of the alignment films 3 and 6 was about 2 degrees.

As shown in FIG. 1, on the upper side of the liquid crystal cell 101 thus fabricated were sequentially stacked negative retardation film 14a, negative uniaxial retardation film 12a, positive uniaxial retardation film 15 and analyzer 13, and on the underside of the liquid crystal cell 101 were sequentially stacked negative retardation film 14a, negative uniaxial retardation film 12b and polarizer 16, whereby the liquid crystal display element 100 according to example 2 was completed.

The aforementioned optical elements were disposed as shown in FIG. 3. It should be noted that alignment treatment directions 17 and 18 in FIG. 3 represent alignment treatment directions in regions corresponding to red pixels and green pixels. Alignment treatment direction in regions corresponding to blue pixels was as described above with reference to FIG. 13.

Retardation Re in the plane of each of the negative retardation films 14a and 14b was 39 nm, which was found from the formula (1) noted above, and retardation Re in the plane of the positive uniaxial retardation film 15 was 150 nm, which was found in the same manner. Similarly, retardations Rth in the thicknesswise direction of each of the negative uniaxial retardation films 12a and 12b were 220 nm.

In this example, the retardation Δnd of the liquid crystal layer 4 defined by the product of the thickness d of the liquid crystal layer 4 and the refractive index anisotropy Δn of liquid crystal molecules 201 was set to 0.81 μm.

In the same manner as in example 1, an image display was made using the liquid crystal display including the liquid crystal display element 100 thus manufactured. As a result, the luminance of the blue pixel assumed its lowest value when the applied voltage was 6.4 V, while the luminance of each of the red pixel and the green pixel assumed its lowest value when the applied voltage was 7.0 V. When a black display was made by application of these voltages, the color coordinates assumed (0.2853, 0.3088). Thus, favorable a black display could be realized.

Though the alignment treatment is performed on regions corresponding to all the blue pixels for alignment in a direction that is different from each of the alignment directions in regions corresponding to the red pixels and the green pixels, it is possible to subject only a part of the regions corresponding to the blue pixels to the alignment treatment. For example, only regions corresponding to blue pixels located around a central portion of the screen may be subjected to the alignment treatment for alignment in a different direction. Usually, the user closely watches a central portion of a screen with less attention to a peripheral portion apart from the central portion. For this reason, a black display with decreased bluishness in such a central portion is considered to be practically satisfactory.

A variation of this example like the aforementioned variation 1 can be realized. That is, a favorable black display can be obtained by the use of a liquid crystal display of the field sequential system comprising a liquid crystal display element constructed in the same manner as with the liquid crystal display element according to example 2 except that any color filter is not provided, and a backlight having LEDs for emitting light of the three primary colors.

Embodiment 3

According to embodiment 3 for carrying out the present invention, there is provided a liquid crystal display wherein a pretilt angle of liquid crystal molecules corresponding to blue pixels for a blue display is made different from each of pretilt angles of liquid crystal molecules corresponding to red pixels and green pixels for a red display and a green display, respectively thereby decreasing bluishness when a black display is made.

EXAMPLE 3

Since the arrangement of a liquid crystal cell included in a liquid crystal display element of a liquid crystal display according to example 3 of this embodiment is similar to that of the liquid crystal cell according to example 2 as shown in FIG. 12, description thereof is omitted. Also, other features than the liquid crystal cell are similar to corresponding features of the liquid crystal display element included in the liquid crystal display according to example 1 having been described with reference to FIG. 1 and, hence, description thereof is omitted.

Hereinafter, the process for manufacturing the liquid crystal display element included in the liquid crystal display according to example 3 will be described with reference to FIGS. 1 and 12. First, the underside of transparent electrode 2 and the upper side of transparent electrode 7 were each coated with a polyimide alignment film-forming coating material JALS-614 produced by JSR Co., Ltd. by a spin coating process, which in turn was baked at 180° C. for one hour and then cured to form alignment films 3 and 6.

Figure 14:
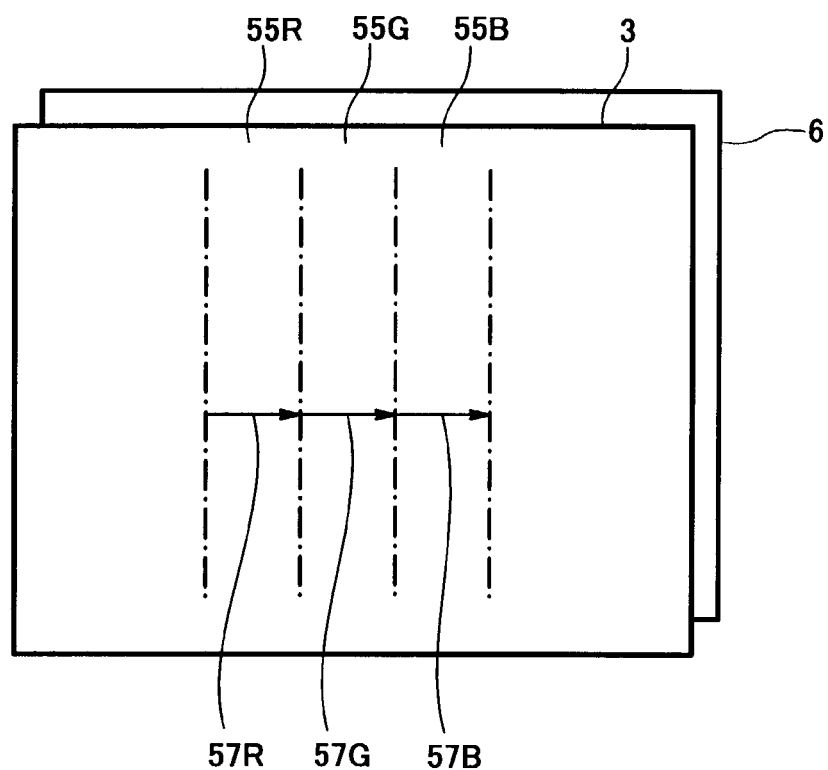
FIG. 14 is an explanatory view indicating a rubbing direction in which an alignment film provided in a liquid crystal display element included in a liquid crystal display according to embodiment 3 for carrying out the present invention is rubbed.

The alignment films 3 and 6 thus formed were each subjected to a rubbing treatment using rubbing cloth of rayon. FIG. 14 is an explanatory view indicating the rubbing direction in this case. As shown in FIG. 14, regions 55R, 55G and 55B of each of the alignment films 3 and 6, respectively, corresponding to red pixels, green pixels and blue pixels were rubbed in the same direction.

The alignment films 3 and 6 were exposed to ultraviolet light with a mask to control amounts of ultraviolet light to be applied to respective regions corresponding to red pixels, green pixels and blue pixels thereby changing their surface conditions. Thereafter, upper substrate 102 and lower substrate 103 were bonded to each other so that the spacing therebetween, that is, the thickness of liquid crystal layer 4, assumed 5.4 μm with use of spacers (not shown) produced by SEKISUI FINE CHEMICAL Co., Ltd. and a sealing resin named STRUCT BOND 352A produced by MITSUI TOUATSU KAGAKU Co., Ltd. Subsequently, a liquid crystal MT-5583 (refractive index anisotropy $\Delta n=0.140$) was injected into the liquid crystal layer 4 by a vacuum injection process to complete the liquid crystal cell 101. The pretilt angles of liquid crystal molecules at red pixel, green pixel and blue pixel were 5.5 degrees, 5.5 degrees and 0.8 degrees, respectively.

Though the pretilt angles of liquid crystal molecules at respective pixels can assume values that are not limited to the aforementioned values, it becomes impossible to decrease bluishness while keeping favorable display characteristics if the difference between the pretilt angle of liquid crystal molecules at blue pixels and each of the pretilt angles of liquid crystal molecules at red pixels and at green pixels is not appropriate. For this reason, the pretilt angle of liquid crystal molecules at blue pixels should be not less than 5% and not more than 50% of each of the pretilt angles of liquid crystal molecules at red pixels and at green pixels, preferably not less than 10% and not more than 40%.

As shown in FIG. 1, on the upper side of the liquid crystal cell 101 thus fabricated were sequentially stacked negative retardation film 14a, negative uniaxial retardation film 12a, positive uniaxial retardation film 15 and analyzer 13, and on the underside of the liquid crystal cell 101 were sequentially stacked negative retardation film 14a, negative uniaxial retardation film 12b and polarizer 16, whereby the liquid crystal display element 100 according to example 3 was completed. The aforementioned optical elements were disposed as shown in FIG. 3.

Retardation Re in the plane of each of the negative retardation films 14a and 14b was 34 nm, which was found from the formula (1) noted above, and retardation Re in the plane of the positive uniaxial retardation film 15 was 100 nm, which was found in the same manner. Similarly, retardation Rth in the thicknesswise direction of each of the negative uniaxial retardation films 12a and 12b was 200 nm.

In this example, the retardation $\Delta nd$ of the liquid crystal layer 4 defined by the product of the thickness d of the liquid crystal layer 4 and the refractive index anisotropy $\Delta n$ of liquid crystal molecules 201 was set to 0.759 μm.

In the same manner as in example 1, an image display was made using the liquid crystal display including the liquid crystal display element 100 thus manufactured. As a result, the luminance of blue pixels of the liquid crystal display element 100 assumed its lowest value when the applied voltage was 6.8 V, the luminance of green pixels assumed its lowest value when the applied voltage was 6.9 V, and the luminance of red pixels assumed its lowest value when the applied voltage was 7.0 V. When a black display was made by application of these voltages to pixels of respective colors, the color coordinates assumed (0.2978, 0.3013). Thus, a favorable black display could be realized.

As described above, liquid crystal molecules at blue pixels have a lower pretilt angle than each of the pretilt angles of liquid crystal molecules at red pixels and at green pixels. For this reason, in a normally white embodiment the voltage-transmittance characteristic of blue pixels shifts to a higher voltage as compared with the case where the pretilt angle of liquid crystal molecules at blue pixels is equal to those of liquid crystal molecules at red pixels and at green pixels and, hence, the retardation of liquid crystal layer 4 at blue pixels having a lower pretilt angle grows larger to assume a value substantially equal to the retardation of the negative retardation film when equal black display voltages are applied, whereby bluishness that occurs when a black display is made can be decreased.

A variation of this example like the aforementioned variation 1 can be realized. That is, a favorable black display can be obtained by the use of a liquid crystal display of the field sequential system comprising a liquid crystal display element constructed in the same manner as with the liquid crystal display element according to example 2 except that any color filter is not provided, and a backlight having LEDs for emitting light of the three primary colors.

Embodiment 4

According to embodiment 4 for carrying out the present invention, there is provided a liquid crystal display wherein liquid crystal molecules having a relatively large refractive index anisotropy $\Delta n$ are employed, while at the same time the retardation $\Delta nd$ of the liquid crystal layer is made relatively small, whereby bluishness of a black display is decreased.

EXAMPLE 4

The arrangement of a liquid crystal cell included in a liquid crystal display element of a liquid crystal display according to example 4 of this embodiment is similar to that of the liquid crystal cell according to example 2 as shown in FIG. 12 and, hence, description thereof is omitted. Also, since other features than the liquid crystal cell are similar to corresponding features of the liquid crystal display element included in the liquid crystal display according to example 1 having been described with reference to FIG. 1, description thereof is omitted.

Hereinafter, the process for manufacturing the liquid crystal display element 100 included in the liquid crystal display according to example 4 will be described with reference to FIGS. 1 and 12. First, the underside of transparent electrode 2 and the upper side of transparent electrode 7 were each coated with an alignment film-forming coating material SE-7492 produced by NISSAN CHEMICAL INDUSTRIES Co., Ltd. by a spin coating process, which in turn was baked at 180° C. for one hour and then cured to form alignment films 3 and 6.

The alignment films 3 and 6 thus formed were rubbed in respective alignment treatment directions 17 and 18 indicated in FIG. 3. Subsequently, the upper substrate 102 and the lower substrate 103 were bonded to each other so that the spacing therebetween, that is, the thickness of liquid crystal layer 4, assumed 5.0 μm with use of spacers 5 produced by SEKISUI FINE CHEMICAL Co., Ltd. and a sealing resin named STRUCT BOND 352A produced by MITSUI TOUATSU KAGAKU Co., Ltd. Thereafter, a liquid crystal MJ97206 (refractive index anisotropy $\Delta n=0.160$) produced by MERCK CO. was injected into the liquid crystal layer 4 by a vacuum injection process to complete the liquid crystal cell 101.

As shown in FIG. 1, on the upper side of the liquid crystal cell 101 thus fabricated were sequentially stacked negative retardation film 14a, negative uniaxial retardation film 12a, positive uniaxial retardation film 15 and analyzer 13, and on the underside of the liquid crystal cell 101 were sequentially stacked negative retardation film 14a, negative uniaxial retardation film 12b and polarizer 16, whereby the liquid crystal display element 100 according to example 3 was completed. The aforementioned optical elements were disposed as shown in FIG. 3.

Retardation Re in the plane of each of the negative retardation films 14a and 14b was 36 nm, which was found from the formula (1) noted above, and retardation Re in the plane of the positive uniaxial retardation film 15 was 150 nm, which was found in the same manner. Retardation Rth in the thicknesswise direction of each of the negative uniaxial retardation films 12a and 12b was 220 nm, which was found from the formula (2) noted above.

In this example, the retardation $\Delta$nd of the liquid crystal layer 4 defined by the product of the thickness d of the liquid crystal layer 4 and the refractive index anisotropy $\Delta$n of liquid crystal molecules 201 was set to 0.80 μm.

In the same manner as in example 1, an image display was made using the liquid crystal display including the liquid crystal display element 100 thus manufactured. As a result, the luminance of blue pixels of the liquid crystal display element 100 assumed its lowest value when the applied voltage was 6.8 V, the luminance of green pixels assumed its lowest value when the applied voltage was 6.9 V, and the luminance of red pixels assumed its lowest value when the applied voltage was 7.0 V. When a black display was made by application of these voltages to pixels of respective colors, the color coordinates assumed (0.2978, 0.3013). Thus, a favorable black display could be realized.

Figure 15:
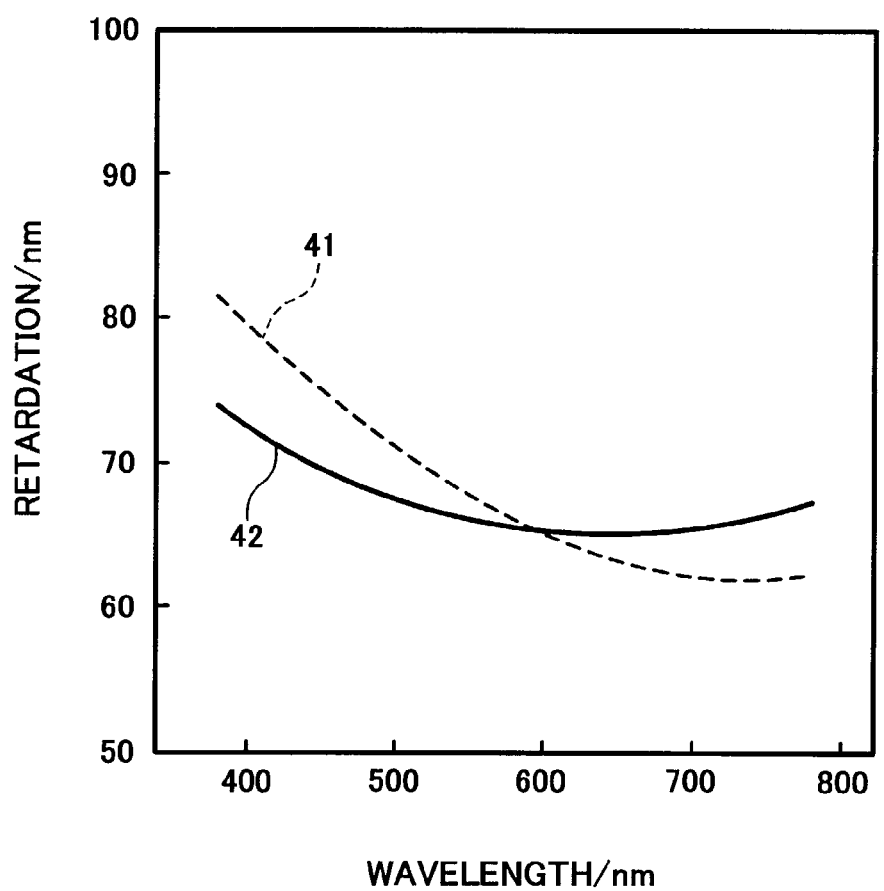
FIG. 15 is a graph for comparison between wavelength dispersion characteristics in accordance with retardations of liquid crystal layers using respective liquid crystal materials that are different in refractive index anisotropy Δn.
Figure 25:
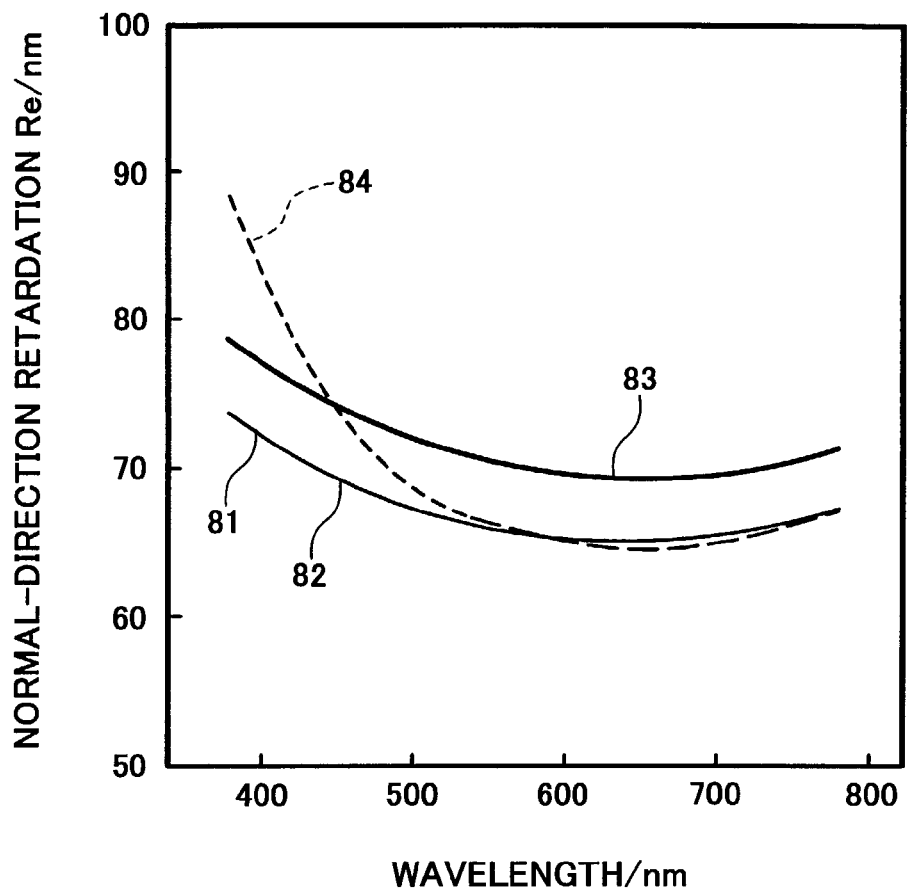
FIG. 25 is a graph showing wavelength dispersion characteristics in accordance with retardations in a normal direction of a liquid crystal layer at red pixel, green pixel and blue pixel included in the conventional OCB embodiment liquid crystal display.

FIG. 15 is a graph for comparison between wavelength dispersion characteristics in accordance with retardations of liquid crystal layers using respective liquid crystal materials that are different in refractive index anisotropy $\Delta$n. In FIG. 15, reference numeral 41 indicates the retardation of liquid crystal layer 4 under the conditions that: the refractive index anisotropy $\Delta$n of the liquid crystal material is 0.160 and the retardation $\Delta$nd is 0.80 μm. Reference numeral 42, on the other hand, indicates the retardation of the liquid crystal layer under the conditions that: the refractive index anisotropy $\Delta$n of the liquid crystal material is 0.140 (MT-5583) and the retardation $\Delta$nd is 0.756 μm. As shown in FIG. 15, the wavelength dispersion characteristic of the liquid crystal layer obtained in the case where the refractive index anisotropy $\Delta$n of the liquid crystal material is larger and the retardation $\Delta$nd is smaller, is steeper in a wavelength region corresponding to blue. Thus, the wavelength dispersion characteristic in this case approximates to the wavelength dispersion characteristic in accordance with retardations of the negative retardation film (see FIG. 25) and, hence, bluishness that occurs when a black display is made can be decreased.

Though it is desirable that the refractive index anisotropy $\Delta$n of the liquid crystal material be relatively large while at the same time the retardation $\Delta$nd be relatively small, it is practically difficult to specify a suitable range of each value. In this respect, the inventors of the present invention provided plural combinations of refractive index anisotropy $\Delta$n of liquid crystal material and retardation $\Delta$nd and conducted experiments to examine to what degree bluishness occurred when a black display was made. The results of the experiments are collectively shown in FIG. 16.

As shown in FIG. 16, when the refractive index anisotropy $\Delta$n of a liquid crystal material was 0.1431 or less, a black display was found to be tinted blue irrespective of the value of retardation $\Delta$nd. Likewise, when the retardation $\Delta$nd was 0.91 or more, a black display was found to be tinted blue irrespective of the value of refractive index anisotropy $\Delta$n of a liquid crystal material. When the refractive index anisotropy $\Delta$n of a liquid crystal material was 0.1502 or more while at the same time the retardation $\Delta$nd was 0.8 μm or less, little bluishness was observed and, hence, a favorable black display could be realized. From these results, it can be judged to be desirable if the refractive index anisotropy $\Delta$n of a liquid crystal material is 0.15 or more while at the same time the retardation $\Delta$nd is 0.8 μm or less.

A variation of this example like the aforementioned variation 1 can be realized. That is, a favorable black display can be obtained by the use of a liquid crystal display of the field sequential system comprising a liquid crystal display element constructed in the same manner as with the liquid crystal display element according to example 2 except that any color filter is not provided, and a backlight having LEDs for emitting lights of the three primary colors.

Embodiment 5

According to embodiment 5 for carrying out the present invention, there is provided a liquid crystal display wherein refractive indexes nx, ny and nz of a retardation film are all adjusted to 1.5 or less, thereby decreasing bluishness of a black display.

EXAMPLE 5

The arrangement of a liquid crystal cell included in a liquid crystal display element of a liquid crystal display according to example 5 of this embodiment is similar to that of the liquid crystal cell according to example 2 as shown in FIG. 12 and, hence, description thereof is omitted. Also, since other features than the liquid crystal cell are similar to corresponding features of the liquid crystal display element included in the liquid crystal display according to example 1 having been described with reference to FIG. 1, description thereof is omitted.

Hereinafter, the process for manufacturing the liquid crystal display element 100 included in the liquid crystal display according to example 5 will be described with reference to FIGS. 1 and 12. Upper substrate 102 and lower substrate 103 were bonded to each other in the same manner as in example 4, and then a liquid crystal MT-5583 (refractive index anisotropy $\Delta$n=0.140) was injected into liquid crystal layer 4 sandwiched between these substrates by a vacuum injection process to complete liquid crystal cell 101.

As shown in FIG. 1, on the upper side of the liquid crystal cell 101 thus fabricated were sequentially stacked negative retardation film 14a, negative uniaxial retardation film 12a, positive uniaxial retardation film 15 and analyzer 13, and on the underside of the liquid crystal cell 101 were sequentially stacked negative retardation film 14a, negative uniaxial retardation film 12b and polarizer 16, whereby the liquid crystal display element 100 according to example 5 was completed. The aforementioned optical elements were disposed as shown in FIG. 3.

The aforementioned negative uniaxial retardation films 12a and 12b each comprised a triacetylcellulose (TAC) film and each had a retardation Rth of 175 nm, which was found from the formula (2) noted above. Further, the refractive indexes nx and ny in the plane of each of the negative uniaxial retardation films 12a and 12b and the refractive index nx in the thicknesswise direction thereof were: nx=1.48671, ny=1.48671, and nz=1.48612.

Retardation Re in the plane of each of the negative retardation films 14a and 14b was 40 nm, which was found from the formula (1) noted above, and retardation Re in the plane of the positive uniaxial retardation film 15 was 150 nm, which was found in the same manner.

In this example, the retardation Δnd of the liquid crystal layer 4 defined by the product of the thickness d of the liquid crystal layer 4 and the refractive index anisotropy Δn of liquid crystal molecules 201 was set to 0.73 μm.

In the same manner as in example 1, an image display was made using the liquid crystal display including the liquid crystal display element 100 thus manufactured. As a result, the luminance of blue pixels of the liquid crystal display element 100 assumed its lowest value when the applied voltage was 6.0 V, and the luminance of green pixels as well as the luminance of red pixels assumed its lowest value when the applied voltage was 5.6 V. When a black display was made by application of these voltages to pixels of respective colors, the color coordinates assumed (0.2878, 0.2995). Thus, a favorable black display could be realized.

Though the refractive indexes nx, ny and nz of each of the negative uniaxial retardation films 12a and 12b each comprising a TAC film were 1.48671, 1.48671 and 1.48612, respectively in this example, it is needless to say that these values are not limitative. Since it is difficult to procure a film having refractive indexes each assuming a value less than 1.45 at present, the value which each of the refractive indexes can assume is desirably not less than about 1.45 and not more than about 1.5.

Comparative Example 2

The liquid crystal display element included in the liquid crystal display according to example 5 has the negative uniaxial retardation films 12a and 12b each comprising a TAC film. In contrast, a liquid crystal display element according to comparative example 2 has negative uniaxial retardation films 12a and 12b each comprising a typical triphenylmethane discotic liquid crystal film. Other features of the liquid crystal display element according to comparative example 2 are similar to corresponding features of the liquid crystal display element according to example 5 and, hence, description thereof is omitted.

The aforementioned negative uniaxial retardation films 12a and 12b each comprising a discotic liquid crystal film each had a retardation Rth of 175 nm in the thicknesswise direction thereof, which was found according to the formula (2) noted above. Further, the refractive indexes nx and ny in the plane of each of the negative uniaxial retardation films 12a and 12b and the refractive index nx in the thicknesswise direction thereof were: nx=1.68671, ny=1.68671, and nz=1.68612.

Further, the color coordinates in the direction normal to a black display made by application of the aforementioned voltages assumed (0.2023, 0.2512), which proved that the black display was tinted blue.

As can be seen from the comparison between example 5 and comparative example 2, a difference was observed in bluishness due to a difference in the type of negative uniaxial retardation films 12a and 12b.

EXAMPLE 6

The negative uniaxial retardation films included in the liquid crystal display element of the liquid crystal display according to example 5 each comprise a TAC film as described above, while in contrast, negative uniaxial retardation films included in a liquid crystal display element of a liquid crystal display according to example 6 each comprise a TAC film and a discotic liquid crystal film.

Figure 17:
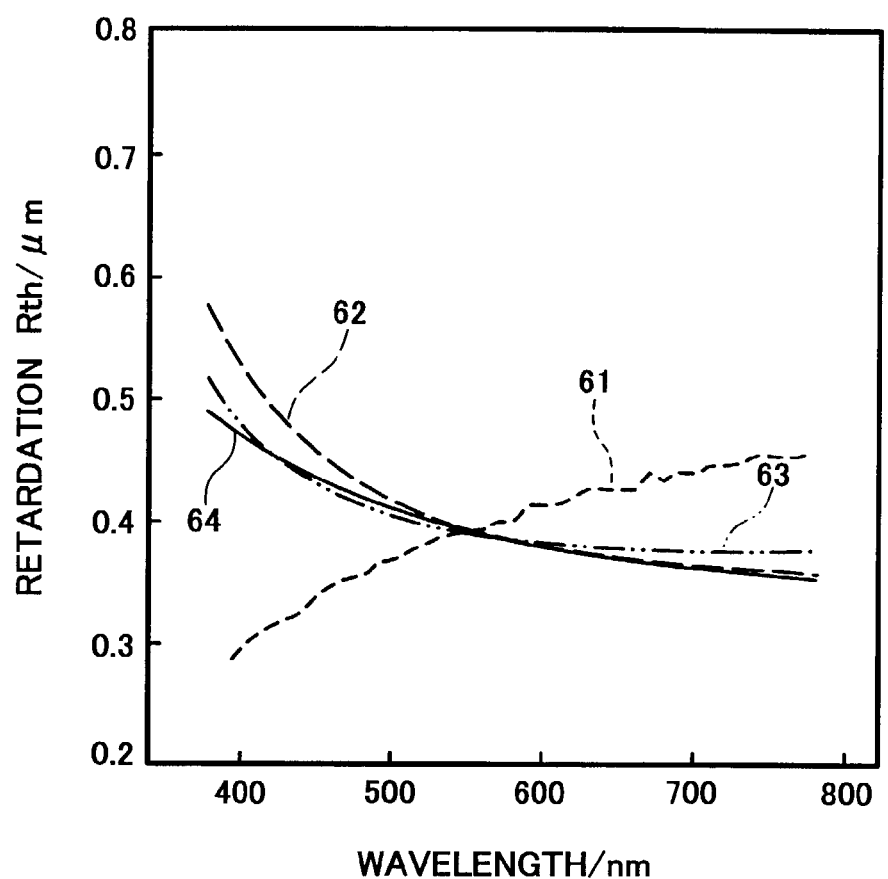
FIG. 17 is a graph showing the wavelength dispersion characteristics of respective optical elements included in a liquid crystal display element.

FIG. 17 is a graph showing wavelength dispersion characteristics in accordance with retardations of respective optical elements. In FIG. 17, reference numerals 61 and 62 indicate the wavelength dispersion characteristic in accordance with retardations of the TAC film and the wavelength dispersion characteristic in accordance with retardations of the discotic liquid crystal film, respectively. Reference numerals 63 and 64 indicate the wavelength dispersion characteristic in accordance with retardations of each negative uniaxial retardation film comprising the TAC film and the discotic liquid crystal film and the wavelength dispersion characteristic in accordance with retardations of a liquid crystal layer, respectively.

As shown in FIG. 17, though the TAC film and the discotic liquid crystal film have different wavelength dispersion characteristics in accordance with retardations, the wavelength dispersion characteristic in accordance with retardations of each negative uniaxial retardation film comprising these films in combination is close to the wavelength dispersion characteristic in accordance with retardations of the liquid crystal layer in a wavelength region corresponding to blue. As can be understood therefrom, the combination of a TAC film and a discotic liquid crystal film allows easy control of the wavelength dispersion characteristic in accordance with retardations of a negative uniaxial retardation film, whereby the wavelength dispersion characteristic of the negative uniaxial retardation film can be made substantially conform to the wavelength dispersion characteristic in accordance with retardations of the liquid crystal layer in the wavelength region corresponding to blue. As a result, it is possible to decrease bluishness that occurs when a black display is made.

Referring to FIG. 1 as well as FIG. 12, the liquid crystal display element included in the liquid crystal display according to example 6 has negative uniaxial retardation films 12a and 12b each comprising a laminated film in which a TAC film and a discotic liquid crystal film are stacked on the other. Retardation Re in the plane of each of the negative uniaxial retardation films 12a and 12b was 150 nm, which was found from the formula (1) noted above, and retardation Rth in the thicknesswise direction of each of the negative uniaxial retardation films was 190 nm, which was found from the formula (2) noted above. Retardation Re in the plane of each of the negative retardation films 14a and 14b was 40 nm, which was found from the formula (1) noted above.

In this example, the retardation Δnd of the liquid crystal layer 4 defined by the product of the thickness d of the liquid crystal layer 4 and the refractive index anisotropy Δn of liquid crystal molecules 201 was set to 0.73 μm.

In the same manner as in example 1, an image display was made using the liquid crystal display including the liquid crystal display element 100 thus manufactured. As a result, the luminance of blue pixels of the liquid crystal display element 100 assumed its lowest value when the applied voltage was 5.9 V, the luminance of green pixels assumed its lowest value when the applied voltage was 6.4 V, and the luminance of red pixels assumed its lowest value when the applied voltage was 6.3 V. When a black display was made by application of these voltages to pixels of respective colors, the color coordinates assumed (0.3133, 0.3187). Thus, a favorable black display could be realized.

EXAMPLE 7

The liquid crystal display element included in the liquid crystal display according to example 5 having been described with reference to FIG. 1 includes negative retardation films 12a and 12b, negative uniaxial retardation films 14a and 14b and positive uniaxial retardation film 15 as retardation films. Stacking plural films as in this case not only makes the construction complicate but also raises the cost of the liquid crystal display element.

Figure 18:
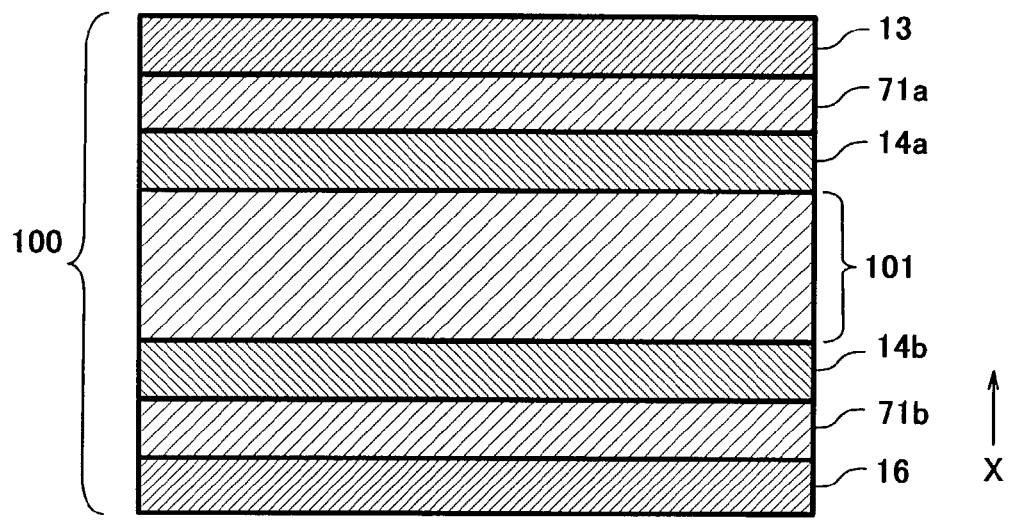
FIG. 18 is a sectional view schematically showing the construction of a liquid crystal display element included in a liquid crystal display according to embodiment 5 for carrying out the present invention.

In view of this, a liquid crystal display element included in a liquid crystal display according to example 7 is constructed to require fewer retardation films. FIG. 18 is a sectional view schematically showing the construction of the liquid crystal display element according to example 7 of this embodiment. As shown in FIG. 18, the liquid crystal display element 100 included in the liquid crystal display according to example 7 has liquid crystal cell 101, on the upper side of which are sequentially stacked a negative retardation film 14a, a biaxial retardation film 71a and an analyzer 13. On the underside of the liquid crystal cell 101 are sequentially stacked a negative retardation film 14b, a biaxial retardation film 71b, and a polarizer 16. The biaxial retardation films 71a and 71b are disposed so that their respective slow axes extend in directions same as the directions in which the transmission axes of the analyzer 13 and the polarizer 16 extends.

As apparent from the comparison between FIG. 1 and FIG. 18, the liquid crystal display element 100 included in the liquid crystal display according to this example does not include any positive uniaxial film 15 and does include the biaxial retardation films 71a and 71b instead of negative uniaxial retardation films 12a and 12b. The positive uniaxial film 15 is a film required to suppress leakage of light. The liquid crystal display element 100 according to example 7 is provided with the biaxial retardation films 71a and 71b to realize such suppression of light leakage.

The biaxial retardation films 71a and 71b each comprised a TAC film, and retardation Re in the plane of each of the biaxial retardation films 71a and 71b was 100 nm, which was found from the formula (1) noted above, while retardation Rth in the thicknesswise direction thereof was 200 nm, which was found from the formula (2) noted above. Retardation Re in the plane of each of the negative retardation films 14a and 14b was 36 nm, which was found from the formula (1) noted above.

In this example, the retardation $\Delta nd$ of liquid crystal layer 4 defined by the product of the thickness d of the liquid crystal layer 4 and the refractive index anisotropy $\Delta n$ of liquid crystal molecules 201 was set to 0.78 μm.

In the same manner as in example 1, an image display was made using the liquid crystal display including the aforementioned liquid crystal display element 100. As a result, the luminance of blue pixels of the liquid crystal display element 100 assumed its lowest value when the applied voltage was 6.7 V, and the luminance of green pixels as well as the luminance of red pixels assumed its lowest value when the applied voltage was 7.1 V. When a black display was made by application of these voltages to pixels of respective colors, the color coordinates assumed (0.2871, 0.2947). Thus, a favorable black display could be realized.

A variation of this example like the aforementioned variation 1 can be realized. That is, a favorable black display can be obtained by the use of a liquid crystal display of the field sequential system comprising a liquid crystal display element constructed in the same manner as with the liquid crystal display element according to example 2 except that any color filter is not provided, and a backlight having LEDs for emitting light of the three primary colors.

Embodiment 6

According to embodiment 6 of the present invention, there is provided a liquid crystal display wherein the amounts of light outgoing from the backlight in respective wavelength regions corresponding to red, green and blue are substantially equalized, thereby decreasing bluishness that occurs when a black display is made.

EXAMPLE 8

Figure 19:
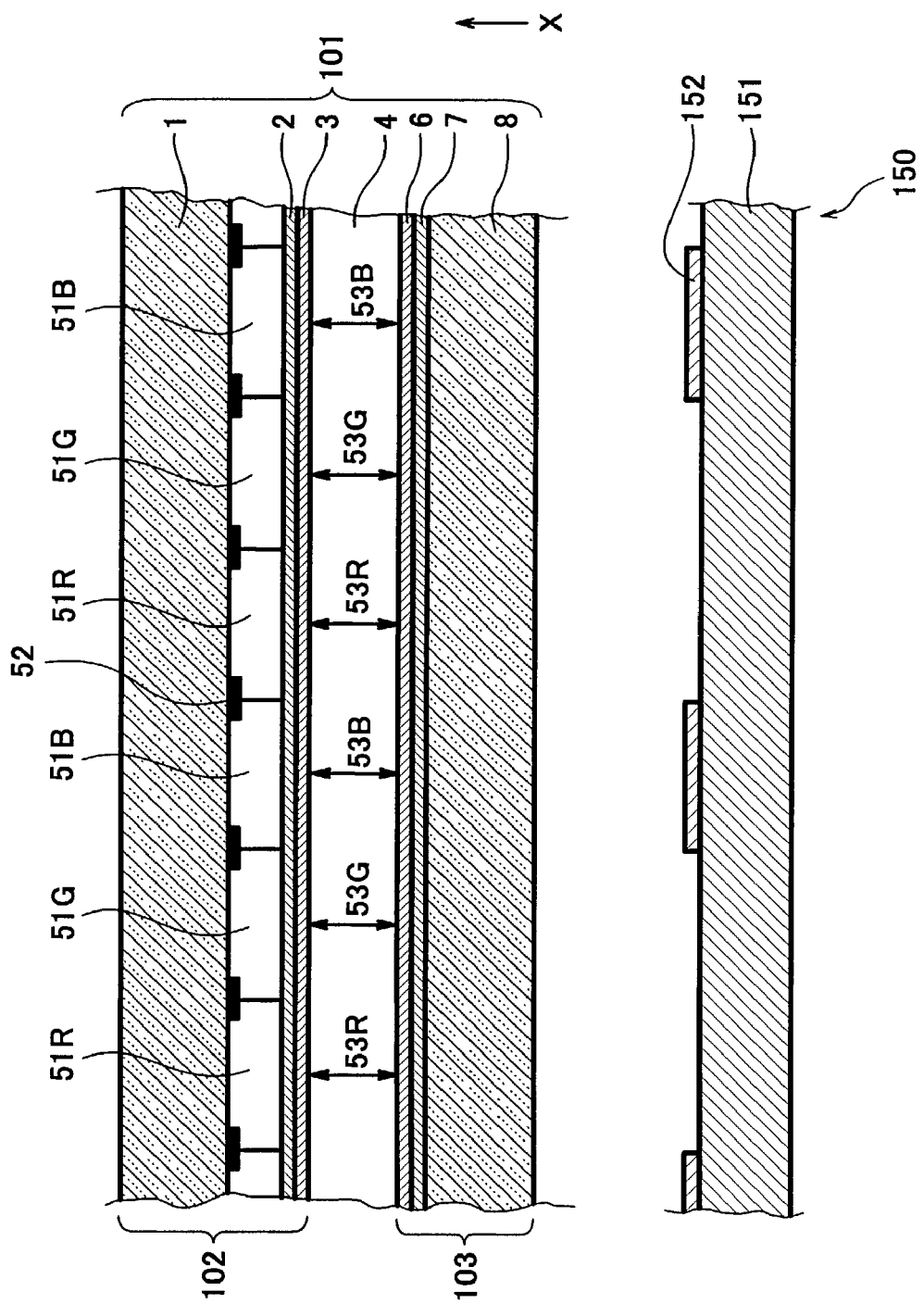
FIG. 19 is a sectional view schematically showing the outline of an exemplary arrangement of the liquid crystal display according to embodiment 6 for carrying out the present invention.

FIG. 19 is a sectional view schematically showing the outline of an arrangement of a liquid crystal display according to example 8 of this embodiment. Liquid crystal display element 100 included in the liquid crystal display according to this example is similar to the liquid crystal display element according to example 2 shown in FIG. 12 and, hence, description thereof is omitted by the use of like reference numerals.

As shown in FIG. 19, backlight 150 disposed below the liquid crystal display element 100 includes a light source 151 comprising a cold cathode ray tube. Between the light source 151 and the liquid crystal display element 100 are disposed interference filters 152. The interference filters 152 are each positioned corresponding to the position of each blue pixel of the liquid crystal display element 100 as shown in FIG. 19.

Figure 20:
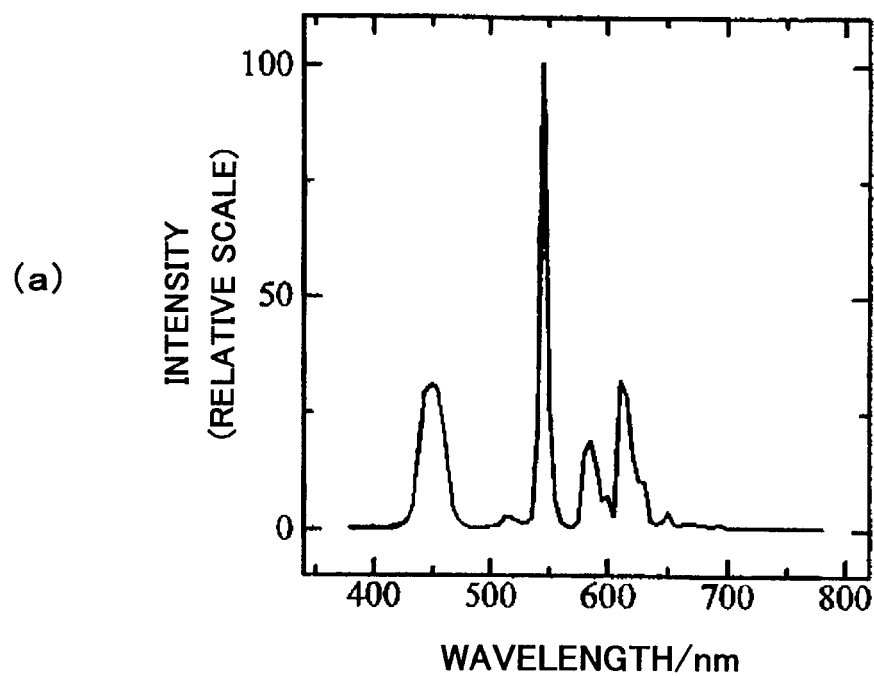
FIG. 20 includes graphs each showing the spectrum of light outgoing from a light source 151 included in the liquid crystal display according to embodiment 6; specifically.
Figure 20:
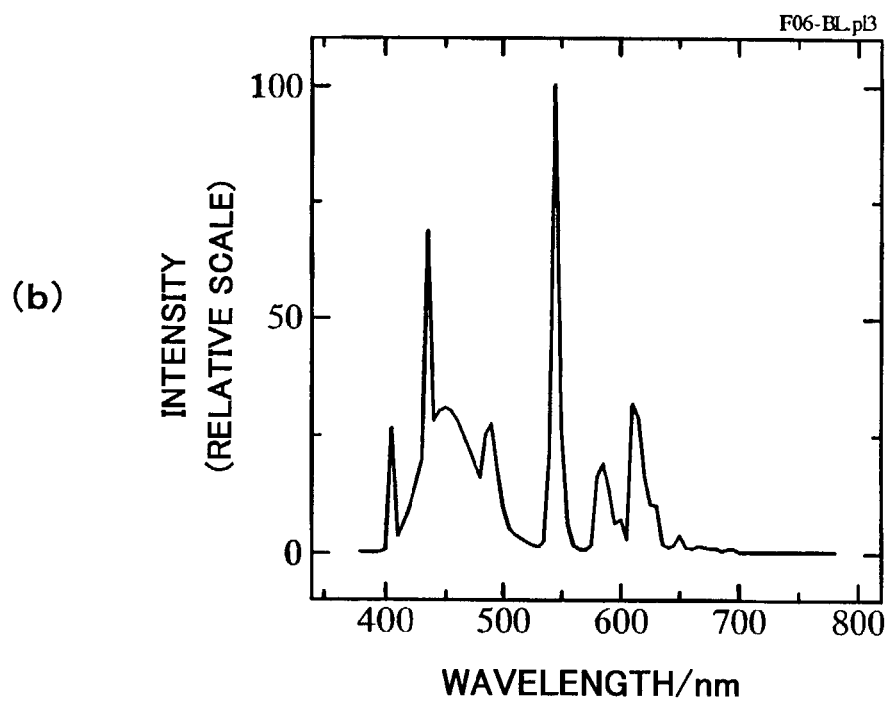

Such an interference filter 152 is a band pass filter allowing light having a wavelength of 450 nm to pass therethrough. FIG. 20 includes graphs each showing the spectrum of light outgoing from a light source 151; specifically, FIGS. 20(a) and 20(b) are graphs showing spectra, respectively, obtained with and without the provision of the interference filter 152. As shown in FIG. 20(a), in the case with the provision of the interference filer 152, the half width of the spectrum of outgoing light in the wavelength region corresponding to blue is 30 nm or less. In the case without the provision of the interference filer 152, in contrast, the half width assumes a larger value.

Thus, the provision of the interference filter 152 makes it possible to decrease the half width of the spectrum of outgoing light in the wavelength region corresponding to blue and, as a result, makes it possible to substantially equalize the amounts of outgoing light in the wavelength regions corresponding to red, green and blue, respectively. Hence, bluishness can be decreased when this liquid crystal display makes a black display.

EXAMPLE 9

Figure 21:
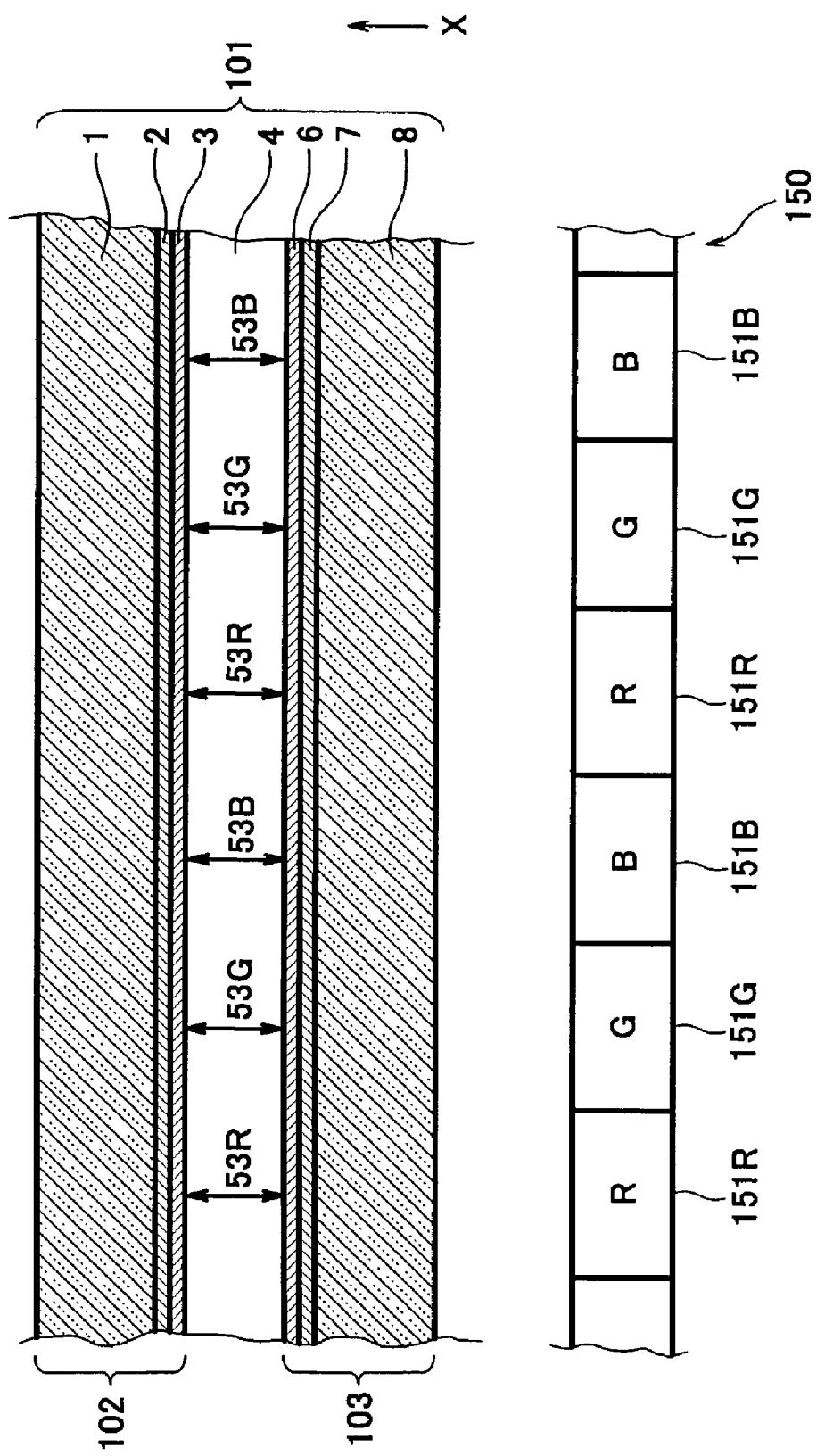
FIG. 21 is a sectional view schematically showing the outline of another arrangement of the liquid crystal display according to embodiment 6.

FIG. 21 is a sectional view schematically showing the outline of an arrangement of a liquid crystal display according to example 9 of this embodiment. Liquid crystal display element 100 included in the liquid crystal display according to this example is similar to the liquid crystal display element according to variation 1 shown in FIG. 10 and, hence, description thereof is omitted by the use of like reference numerals.

Figure 22:
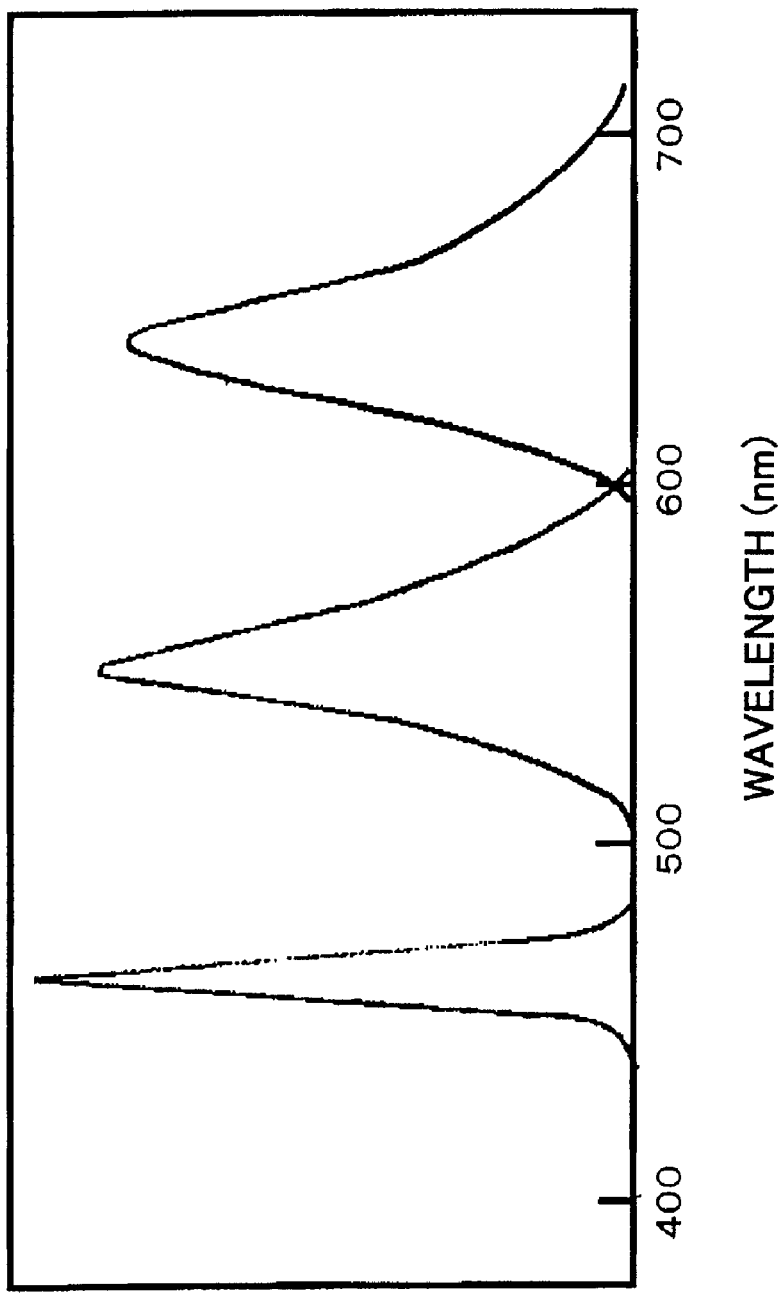
FIG. 22 is a graph showing the spectrum of an LED as a light source included in a backlight of the liquid crystal display according to embodiment 6.

As shown in FIG. 21, backlight 150 disposed below the liquid crystal display element 100 includes a light source having LEDs spread with predetermined intervals for emitting lights of respective three primary colors. FIG. 22 is a graph showing the emission spectra of LEDs forming the light source of the aforementioned backlight 150. In the liquid crystal display according to example 9 the LEDs of the backlight 150 emit lights of respective colors by time division in the order of red, green and blue to realize a color display.

When the liquid crystal display of such a field sequential color system according to example 9 made a black display, bluishness could be decreased.

Figure 23:
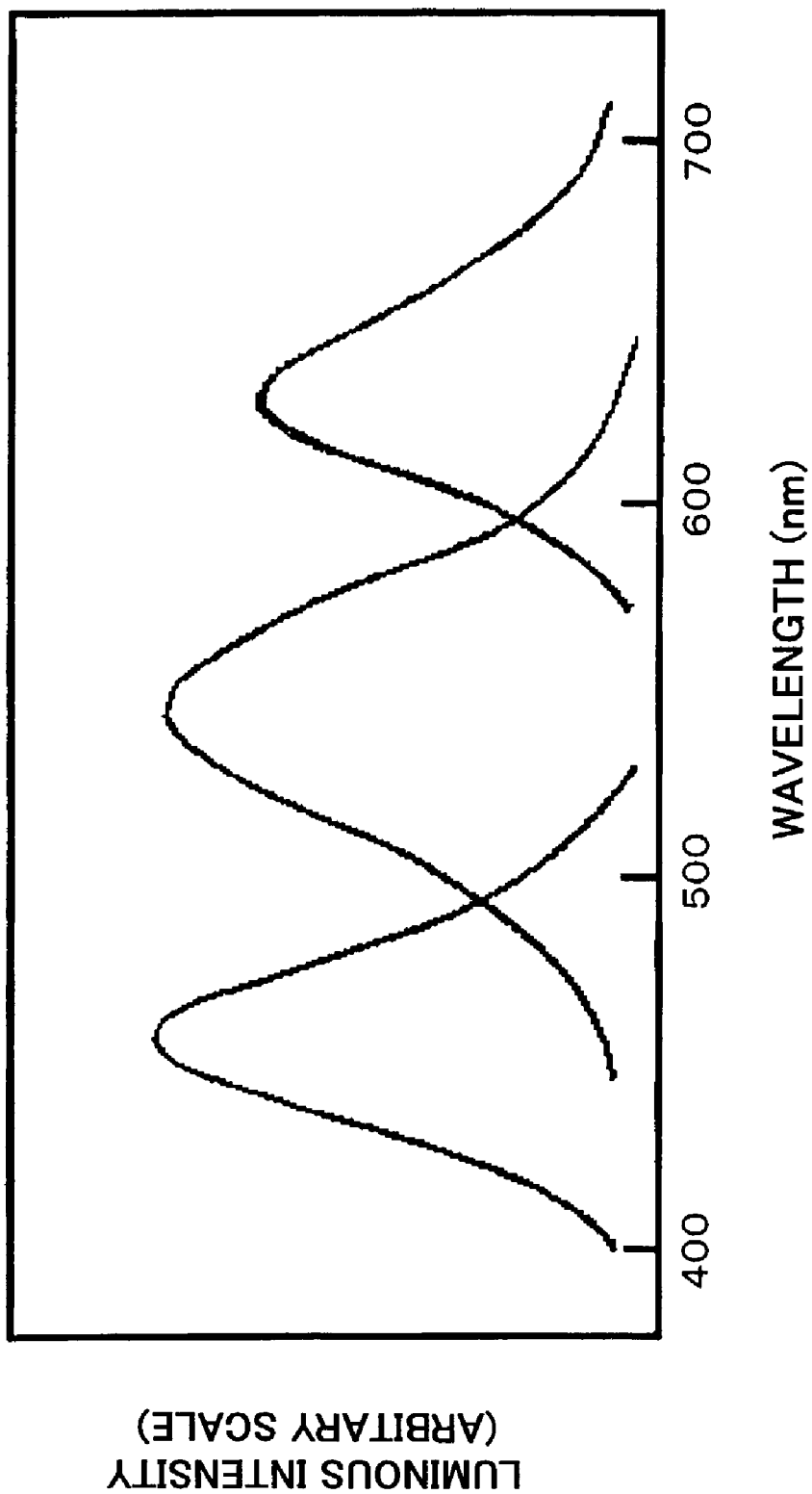
FIG. 23 is a graph showing the spectrum of an EL as a light source included in a backlight of the liquid crystal display according to embodiment 6.
Figure 24:
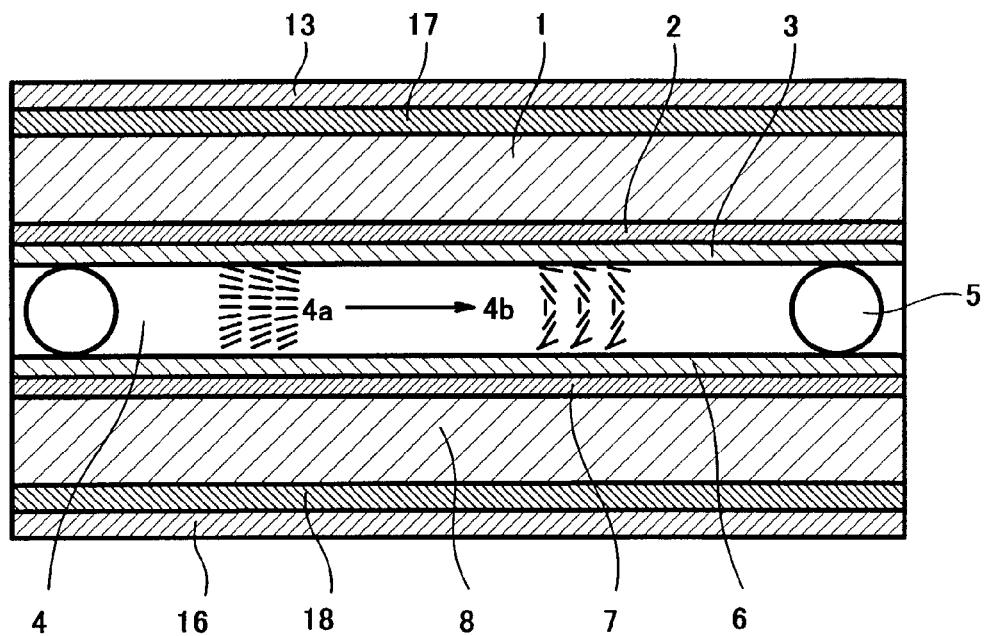
FIG. 24 is a sectional view schematically showing the construction of a conventional OCB embodiment liquid crystal display element.

Meanwhile, it is possible to use an electroluminescent device (hereinafter referred to as "EL") as a light source included in the backlight 150 instead of such an LED. FIG. 23 is a graph showing emission spectra of respective Els included in the aforementioned backlight 150. When a liquid crystal display employing Els as light sources made a black display in the same manner as above, it was also possible to decrease bluishness.

It is needless to say that the aforementioned example 9 may employ LEDs or ELs adapted to emit white light to realize a color display by means of a color filter system as in example 8.

As described above, any one of the liquid crystal displays according to the present invention is capable of decreasing bluishness that occurs when a black display is made.

From the foregoing description, many modifications and other embodiments of the present invention are apparent for those skilled in the art. Therefore, the foregoing description should be construed as a merely illustration and is provided for the purpose of teaching the best embodiment for carrying out the present invention to those skilled in the art. Specific structures and/or functions of the present invention may be modified without departing from the spirit of the present invention.

INDUSTRIAL APPLICABILITY

The liquid crystal display according to the present invention is useful as a wide viewing angle liquid crystal television, a liquid crystal monitor, and a liquid crystal display of a mobile telephone. The method of manufacturing a liquid crystal display according to the present invention is useful as a method of easily manufacturing such a liquid crystal display.

The invention claimed is:

1. A liquid crystal display comprising a liquid crystal display element having a liquid crystal layer containing liquid crystal molecules oriented so as to assume a bend alignment when an image display is being made, and at least one negative retardation plate for compensating for a retardation of the liquid crystal layer, wherein the display is made by varying the retardation of the liquid crystal layer in accordance with video signals inputted from outside to vary the transmittance of the liquid crystal display element to light for display, characterized in that:

the negative retardation plate has a hybrid-aligned primary axis, and the liquid crystal display element includes a plurality of red pixels for displaying a red color, a plurality of green pixels for displaying a green color, and a plurality of blue pixels for displaying a blue color; and a thickness of the liquid crystal layer associated with the blue pixels is larger than a thickness of the liquid crystal layer associated with the red pixels and the green pixels, wherein the thickness of liquid crystal layers associated with red pixels and green pixels are equal.

2. The liquid crystal display according to claim 1, wherein a difference between the thickness of the liquid crystal layer associated with the blue pixels and the thickness of the liquid crystal layer associated with the red pixels and the green pixels is not less than 0.2 μm and not more than 1.0 μm.

3. The liquid crystal display according to claim 1, wherein the thickness of the liquid crystal layer associated with the blue pixels is not less than 104% and not more than 120% of the thickness of the liquid crystal layer associated with the red pixels and the green pixels.

4. The liquid crystal display according to claim 1, further comprising a lighting device having light sources for emitting a red light, a green light and a blue light, respectively, and lighting device control means for controlling the lighting device in a manner to cause the light sources to emit respective color lights by time division.

* * * * *

UNITED STATES PATENT AND TRADEMARK OFFICE
CERTIFICATE OF CORRECTION

PATENT NO.        : 7,057,684 B2
APPLICATION NO.   : 10/220064
DATED             : June 6, 2006
INVENTOR(S)       : Shoichi Ishihara et al.

It is certified that error appears in the above-identified patent and that said Letters Patent is hereby corrected as shown below:

On the Title page,

Item (87) "PCT Pub. Date:", change "Apr. 28, 2002" to -- Apr. 25, 2002 --

Item (56) "References Cited, FOREIGN PATENT DOCUMENTS", change "SHO 59-208577    11/1998" to -- SHO 59-208577   11/1984 --

Signed and Sealed this

Ninth Day of January, 2007

JON W. DUDAS
*Director of the United States Patent and Trademark Office*